US009813508B2

(12) United States Patent
Xiao

(10) Patent No.: US 9,813,508 B2
(45) Date of Patent: Nov. 7, 2017

(54) APPROACH FOR PROVIDING SERVICE WORKFLOWS THROUGH DEVICES

(71) Applicant: Zhenning Xiao, Renton, WA (US)

(72) Inventor: Zhenning Xiao, Renton, WA (US)

(73) Assignee: Ricoh Company, Ltd., Tokyo (JP)

( * ) Notice: Subject to any disclaimer, the term of this patent is extended or adjusted under 35 U.S.C. 154(b) by 359 days.

(21) Appl. No.: 13/857,286

(22) Filed: Apr. 5, 2013

(65) Prior Publication Data

US 2014/0304319 A1 Oct. 9, 2014

(51) Int. Cl.
G06F 15/16 (2006.01)
H04L 29/08 (2006.01)
H04L 12/24 (2006.01)

(52) U.S. Cl.
CPC .......... H04L 67/16 (2013.01); H04L 41/5058 (2013.01)

(58) Field of Classification Search
CPC .... H04L 41/5051; H04L 63/10; G06F 3/1232
See application file for complete search history.

(56) References Cited

U.S. PATENT DOCUMENTS

| | | | |
|---|---|---|---|
| 6,094,548 A | 7/2000 | Gunning et al. | |
| 7,016,962 B2 | 3/2006 | Hertling et al. | |
| 2002/0120742 A1 | 8/2002 | Cherry | |
| 2003/0090694 A1 | 5/2003 | Kennedy et al. | |
| 2004/0223182 A1* | 11/2004 | Minagawa | G06F 3/1203 358/1.15 |
| 2004/0249908 A1 | 12/2004 | Valladares et al. | |
| 2007/0133044 A1 | 6/2007 | Tanaka | |
| 2007/0174297 A1* | 7/2007 | Kim | 707/10 |
| 2008/0079975 A1 | 4/2008 | Ferlitsch | |
| 2008/0180699 A1 | 7/2008 | Selvaraj | |
| 2009/0046315 A1 | 2/2009 | Ferlitsch | |
| 2010/0188688 A1 | 7/2010 | Selvaraj et al. | |
| 2010/0198840 A1 | 8/2010 | Basu et al. | |

(Continued)

FOREIGN PATENT DOCUMENTS

WO   WO2010089826   *  8/2010

OTHER PUBLICATIONS

U.S. Appl. No. 13/333,454, filed Dec. 21, 2011, Notice of Allowance dated Apr. 23, 2014.

(Continued)

*Primary Examiner* — Glenford Madamba
(74) *Attorney, Agent, or Firm* — Hickman Palermo Becker Bingham LLP; Edward A. Becker

(57) ABSTRACT

An approach for providing service workflows through devices includes a service server determining that a service is available for a particular device. In response to determining that the service is available for the particular device, the service server obtains, from the particular device, service information that specifies, for the service, at least one or more processes that implement the service on the particular device, one or more parameters for the one or more processes and one or more user interfaces for the one or more processes. The service server generates, based upon the service information, a service application that implements the service. The service server receives, from a client device, a request to use the service for the particular device and in response, the service server provides to the client device the service application that implements the service.

20 Claims, 25 Drawing Sheets

(56) References Cited

U.S. PATENT DOCUMENTS

| | | |
|---|---|---|
| 2011/0106882 A1* | 5/2011 | Takakura et al. ............. 709/203 |
| 2011/0283200 A1 | 11/2011 | Koren |
| 2012/0059916 A1* | 3/2012 | Ohashi ..................... G06F 8/61 |
| | | 709/222 |
| 2012/0243028 A1 | 9/2012 | Dumitrescu |
| 2012/0278743 A1 | 11/2012 | Heckman et al. |
| 2013/0159378 A1* | 6/2013 | Misovski et al. ............. 709/203 |
| 2013/0163014 A1 | 6/2013 | Xiao |

OTHER PUBLICATIONS

U.S. Appl. No. 13/333,454, filed Dec. 21, 2011, Office Action dated Sep. 4, 2013.
U.S. Appl. No. 13/333,454, filed Dec. 21, 2011 Final Office Action dated Dec. 18, 2013.
U.S. Appl. No. 13/560,994, filed Jul. 28, 2012, Final Office Action dated Apr. 29, 2015.
U.S. Appl. No. 13/560,994, filed Jul. 28, 2012, Office Action dated Nov. 13, 2014.
U.S. Appl. No. 13/560,994, filed Jul. 28, 2012, Advisory Action dated Jul. 14, 2015.
U.S. Appl. No. 13/560,994, filed Jul. 28, 2012, Office Action dated Sep. 10, 2015.
Zaio, U.S. Appl. No. 13/560,994, filed Jul. 28, 2012, Final Office Action dated May 11, 2017.

* cited by examiner

Sample of Different levels of Service Data information

Server Database 610

```xml
<ServiceData Value="Server Level">
  <ServiceList>
    <Service>
      <ServiceID Value="00031" />
      <ServiceName Value="http://www.abc-read.com" />
      <ServiceIP Value="74.52.24.99" />
      <ServiceSecurity Value="None" />
      <ServiceCredentialRequired Value="None" />
      <ServiceConnectType Value="Web HTML" />
      <ServiceCategory Value="Child Education" />
      <ServicePaymentType Value="Free" />
      <Service Value="http://www.abc-read.com" />
      <DisplayName xml:lang="en-US">ABC-Read service</DisplayName>
      <FeatureOption Value="Learn to Read">
        <DisplayName xml:lang="en-US">Learn to Read</DisplayName>
        <ServiceAddress>http://www.abc-read.com/reading.html</ServiceAddress>
      </FeatureOption>
      <FeatureOption Value="Parent Education">
        <DisplayName xml:lang="en-US">Parent Education Service</DisplayName>
        <ServiceAddress>http://www.abc-read.com/parents</ServiceAddress>
      </FeatureOption>
      <FeatureOption Value="ActivityPad">
        <DisplayName xml:lang="en-US">ActivityPad</DisplayName>
        <ServiceAddress>http://www.abc-read.com/ActivityPad</ServiceAddress>
      </FeatureOption>
    </Service>
  </ServiceList>
</ServiceData>
```

Client Database 620

```xml
<ServiceData Value="Client Level">
  <ServiceList>
    <Service>
      <ServiceID Value="00031" />
      <ServiceName Value="http://www.abc-read.com" />
      <ServiceIP Value="74.52.24.99" />
      <ServiceSecurity Value="None" />
      <ServiceCredentialRequired Value="None" />
      <ServiceConnectType Value="Web HTML" />
      <ServiceCategory Value="Child Education" />
      <ServicePaymentType Value="Free" />
      <Service Value="http://www.abc-read.com" />
      <DisplayName xml:lang="en-US">ABC-Read service</DisplayName>
      <FeatureOption Value="Learn to Read">
        <DisplayName xml:lang="en-US">Learn to Read</DisplayName>
        <ServiceAddress>http://www.abc-read.com/reading.html</ServiceAddress>
      </FeatureOption>
      <FeatureOption Value="Parent Education">
        <DisplayName xml:lang="en-US">Parent Education Service</DisplayName>
        <ServiceAddress>http://www.abc-read.com/parents</ServiceAddress>
      </FeatureOption>
      <FeatureOption Value="ActivityPad">
        <DisplayName xml:lang="en-US">ActivityPad</DisplayName>
        <ServiceAddress>http://www.abc-read.com/ActivityPad</ServiceAddress>
      </FeatureOption>
    </Service>
  </ServiceList>
</ServiceData>
```

Client UI Database 630

```xml
<ServiceData Value="UI Level">
  <User Name="user1">
    <ServiceList>
      <Service>
        <ServiceID Value="00031" />
        <ServiceName Value="http://www.abc-read.com" />
        <ServiceIP Value="74.52.24.99" />
        <ServiceSecurity Value="None" />
        <ServiceCredentialRequired Value="None" />
        <ServiceConnectType Value="Web HTML" />
        <ServiceCategory Value="Child Education" />
        <ServicePaymentType Value="Free" />
        <Service Value="http://www.abc-read.com" />
        <DisplayName xml:lang="en-US">ABC-Read service</DisplayName>
        <FeatureOption Value="Learn to Read">
          <DisplayName xml:lang="en-US">Learn to Read</DisplayName>
          <ServiceAddress>http://www.abc-read.com/reading.html</ServiceAddress>
        </FeatureOption>
        <FeatureOption Value="Parent Education">
          <DisplayName xml:lang="en-US">Parent Education Service</DisplayName>
          <ServiceAddress>http://www.abc-read.com/parents</ServiceAddress>
        </FeatureOption>
        <FeatureOption Value="ActivityPad">
          <DisplayName xml:lang="en-US">ActivityPad</DisplayName>
          <ServiceAddress>http://www.abc-read.com/ActivityPad</ServiceAddress>
        </FeatureOption>
      </Service>
    </ServiceList>
  </User>
</ServiceData>
```

UI for Integrated Service Gathering and Selection Client

Service Client

Service Selection Filter Preference 710

- ☐ Any Service
- ☑ Connection
  - ☑ Any
  - ☐ Company Internet
  - ☐ Company Web Site
  - ☐ IP List Approved by Com
- ☑ Security Based
  - ☑ Any
  - ☐ Secured Only
- ☑ Log-in Credentials
  - ☑ Any
  - ☐ Local Machine Creden
  - ☐ Domain Credentials
- ☑ Service Category
  - ☐ Any
  - ☐ Web Store
  - ☑ Satellite & Translation
  - ☐ Calendar & Alert
  - ☐ Business Printing
  - ☐ Mailing & Packaging
  - ☑ Child Education
- ☑ Service Provider
  - ☑ Any
  - ☐ Microsoft SkyDrive
  - ☐ US Post Office
  - ☐ Ricoh Business Printin
  - ☐ StarFall Child Educato
  - ☐ Google Translate
- ☑ Payment Based
  - ☐ Any
  - ☑ Free Service
  - ☐ Payment Required

Service Feature/Option 720

- ☑ Grade
  - ☐ Any
  - ☐ Preschool
  - ☐ Kindergarten
  - ☐ Grade 1
- ☑ Academic
  - ☐ Any
  - ☑ Book
  - ☐ Stationery
  - ☐ School Uniform
  - ☐ Event Costumes
- ☐ Activities
  - ☐ Any
  - ☐ Summer Camps
  - ☐ Field Tribs
  - ☐ Tennis Lessons
  - ☐ Swimming Class
- ☑ Tutoring
  - ☐ Any
  - ☐ SAT Exam Prep
  - ☑ Learn to Read
  - ☐ Grammer Tutorial
- ☐ Event Service
  - ☐ Any
  - ☐ Birthday Celebrat
  - ☐ Kindergarten

[Add Service 750] [Delete Service 760] [Auto Detection 770]

[Customize Selection 780] [Update from Provider 790]

Service UI from Provider

Service Providers 730 http://www.abc.education.com
http://www.school-service.com
http://www.parenting-services.com
http://www.student-assistant.com
http://healthy.kids.com

Service Feature Set 740

Contents Learn to Read
- Home
- Reading Checklist
- Sporting problems

Reading Strategy
- Talking & Listening
- Reading Together
- Learn about Books
- Efforts to Write
- Another Language Reading Games
- Baby Talk
- Books and Babbles
- Chat with Children
- As Sample as ABC
- What's Next?
- Home for My Books
- Worth 1000 words
- Rhyme with Me
- Match my Sounds
- Take a Bowl
- Family Stones

FIG. 20

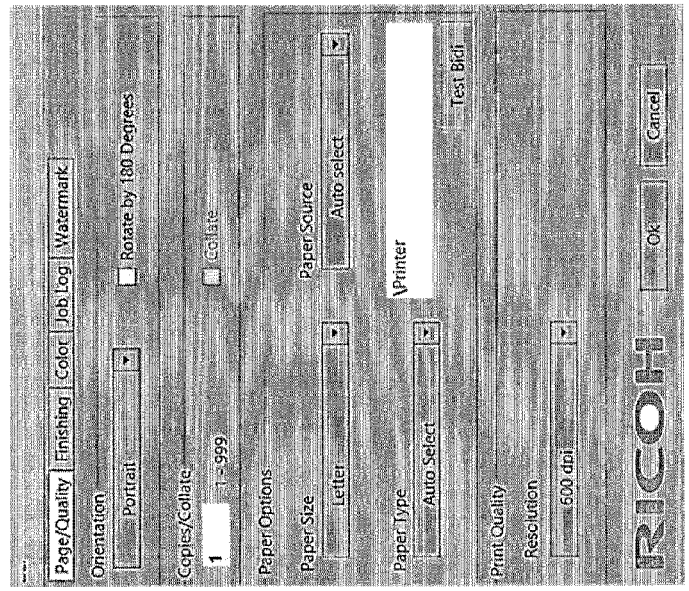

```
<Image Margin="0,417,504.8,4.2" Source="RicohIcon.png" />
<TabControl >
  <TabItem Header="Papge/Quality" >
    <GroupBox Header="Orientation" >
      <ComboBox Uid="ComboBox_Orientation"/>
      <CheckBox Uid="CheckBox_Roate180"/>
    </GroupBox>
    <GroupBox Header="Copies/Collate" >
      <TextBox Uid="TextBox_Copies" />
      <CheckBox Content="Collate" />
    </GroupBox>
    <GroupBox Header="Paper Options" >
      <Label Content="Paper Size:" />
      <ComboBox Uid="ComboBox_PaperSize"/>
      <Label Content="Paper Source:" />
      <ComboBox Uid="ComboBox_PaperSource"/>
      <Label Content="Paper Type:" />
      <ComboBox Uid="ComboBox_PaperType"/>
    </GroupBox>
    <GroupBox Header="Print Quality" >
      <Label Content="Resolution:" />
      <ComboBox Uid="ComboBox_Resolution"/>
    </GroupBox>
  </TabItem>
  <TabItem Header="Finishing" Margin="0" >
    <GroupBox Header="Print on Both Sides:" >
      <ComboBox Uid="ComboBox_Duplex"/>
    </GroupBox>
  </TabItem>
</TabControl>
```

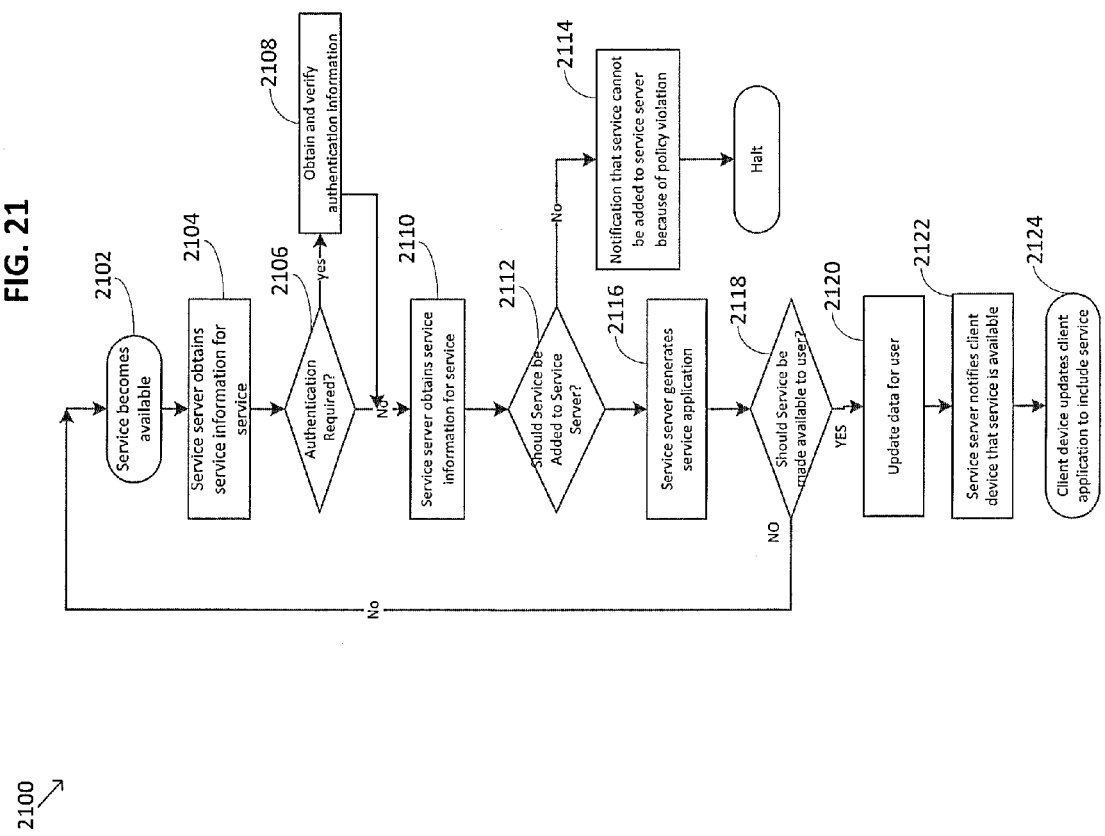

APPROACH FOR PROVIDING SERVICE WORKFLOWS THROUGH DEVICES

CROSS-REFERENCE TO RELATED APPLICATIONS

This application is related to U.S. patent application Ser. No. 13/560,994,filed Jul. 28, 2012, which is a continuation-in-part application of U.S. patent application Ser. No. 13/333,454, filed Dec. 21, 2011, the entire contents all of which are hereby incorporated by reference as if fully set forth herein for all purposes.

FIELD

Embodiments relate to network service management and, more particularly, to retrieving information about multiple network services and integrating that information in a user-friendly way to end-users in order to use one or more of the network services.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Due to the Internet and Web technologies, the number of network services has been growing rapidly. Most users, after discovering a network service (e.g., a translation service) with which they are satisfied, will return to that service whenever they have a need for that particular service. However, such a one-application-per-service model has become cumbersome for users as there are thousands of services available on the Internet. Keeping tracking of all the available network services is difficult for even experienced Web users.

Furthermore, if there are multiple network services that provide a similar service and a user desires to use one of them, then the user must individually examine each network service separately and remember (or record) all the features and options provided by each in order to compare the network services and determine which network service to use. Also, each network service provides its own user interface (UI), with which the user must become familiar.

Additionally, some network services require a client-side program, such as a driver or other third party software, to execute on a client device in order for a user to utilize the network services. Thus, a user might have to manually install, into the local operating system of the user's device, a driver or third party application program for each network service, assuming that a driver or third party application program is available for each network service.

SUMMARY

An approach for providing service workflows through devices includes a service server determining that a service is available for a particular device. In response to determining that the service is available for the particular device, the service server obtains, from the particular device, service information that specifies, for the service, at least one or more processes that implement the service on the particular device, one or more parameters for the one or more processes and one or more user interfaces for the one or more processes. The service server generates, based upon the service information, a service application that implements the service. The service server receives, from a client device, a request to use the service for the particular device and in response to receiving, from the client device, the request to use the service for the particular device, the service server providing to the client device the service application that implements the service. The approach may be implemented by instructions stored on one or more computer-readable media, by one or more devices, or by one or more computer-implemented methods.

BRIEF DESCRIPTION OF THE DRAWINGS

In the drawings:

FIG. 6 is a block diagram that depicts example generic service description data for each of a server, a client, and a user interface, according to an embodiment;

FIG. 7 is a block diagram that depicts an example user interface, according to an embodiment;

FIG. 20 depicts example service UI information in the form of XML statements 2000.

FIG. 21 is a flow diagram that depicts adding a service to the service server.

DETAILED DESCRIPTION

In the following description, for the purposes of explanation, numerous specific details are set forth in order to provide a thorough understanding of the embodiments. It will be apparent, however, that the embodiments may be practiced without these specific details. In other instances, well-known structures and devices are shown in block diagram form in order to avoid unnecessarily obscuring the embodiments.

GENERAL OVERVIEW

Embodiments include an integrated service feature gathering and selection system. In an embodiment, a single, combined UI for managing multiple network services is presented. In an embodiment, an application program system dynamically queries and updates itself (e.g., automatically or upon being requested) with all connected network service information across mobile or business network environments. The application program system simplifies the process of multi-service management and provides a straight-forward user experience under complicated network environments.

In an embodiment, an application program enables a computer operating system (OS) to manage multiple network services in dynamic environments. Network services can be connected via a local Ethernet network or via a remote network through internet protocol. An OS might assign a unique port for each connected network service and provide APIs for data communication. The application program provides a unified, feature-oriented UI for multiple network services and automatically selects a network service according to a user's selections.

In a related embodiment, a client device executes a browser that requests a unified, feature-oriented UI for multiple network services and automatically selects a network service according to the user's selections.

Service Feature Gathering and Selection System

Figure 1:
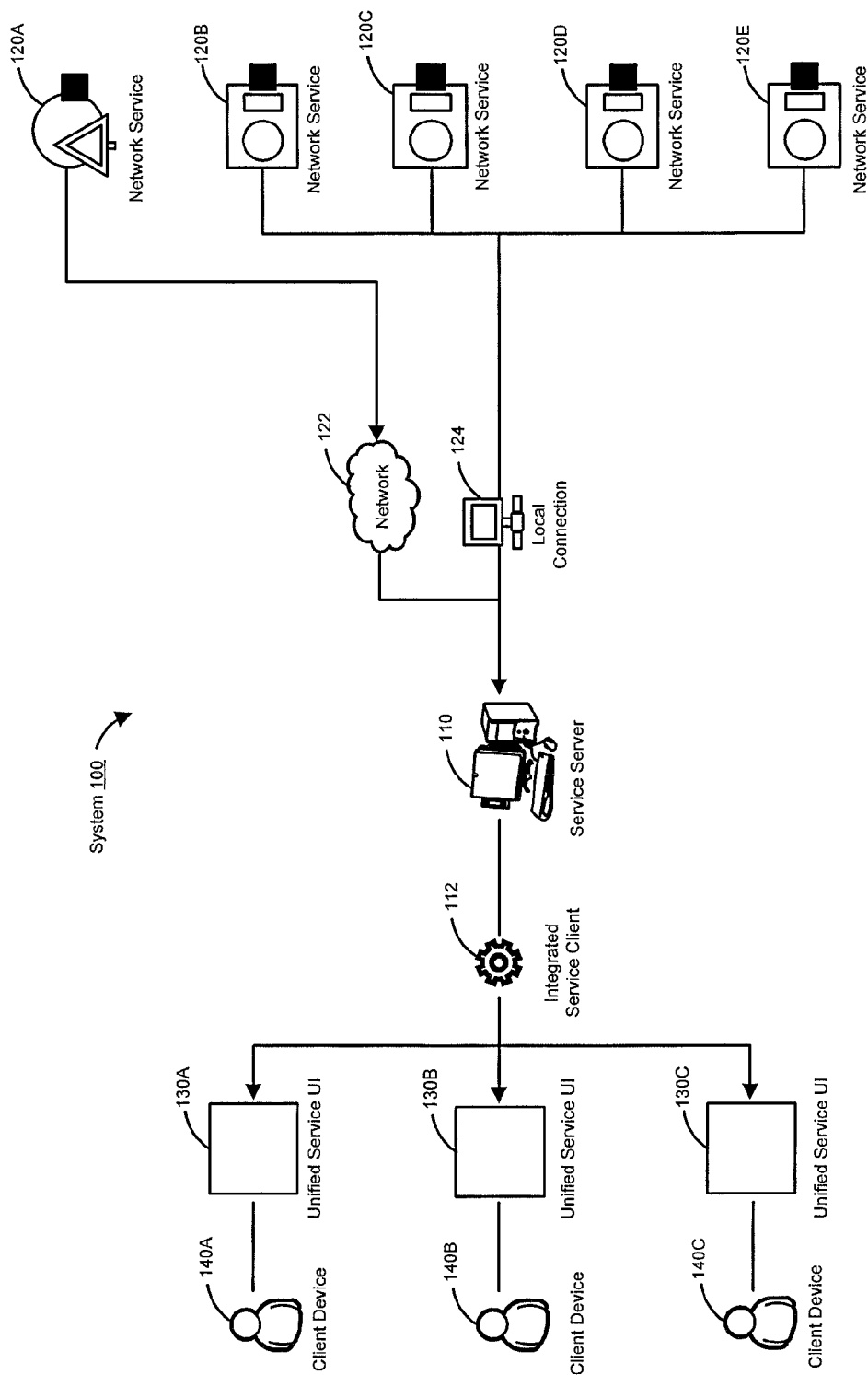
FIG. 1 is a block diagram that depicts an example network service feature gathering and selection system, according to an embodiment.

FIG. 1 is a block diagram that depicts an example service feature gathering and selection system 100, according to an embodiment. System 100 comprises a service server 110, an integrated service client 112, network services 120A-E, network 122, local connection 124, unified service UIs 130A-C, and client devices 140A-C.

Service server 110 is a network device that comprises one or more processors and memory and that is communicatively coupled to network services 120A-E and client devices 140A-C. Service server 110 communicates with network service 120A via network 122 and communicates with network services 120B-E and user client 130A-C via a local connection 124. Examples of network 122 include, without limitation, a Wide Area Network (WAN), the Internet, or one or more terrestrial, satellite or wireless links. Examples of local connection 124 include, without limitation, a Local Area Network (LAN), Ethernet, or one or more terrestrial, satellite or wireless links.

Service server 110 receives service capabilities data from network services 120A-E. Services capabilities data is data that specifies a network service's currently supported features and options, i.e., allowed values for each feature, of network services 120A-E. Because the number and type of network services 120A-E are virtually limitless, examples of network service features are similarly virtually limitless. In the print context, example features include paper size, orientation, duplex, print quality, color, etc. Each feature has one or more options, i.e., values. For example, duplex unit has two options, such as "Installed" or "Not Installed." Other features, for example, paper size, may have many options, e.g., "A4", "legal", "8½×11", etc.

Embodiments are not limited to any particular technique for communicating between service server 110 and network services 120A-E in order for service server 110 to obtain service capabilities data about network services 120A-E. For example, such communication might be achieved through Simple Network Management Protocol (SNMP) or Web Services for Devices (WSD) technologies. Recent development of WSD technologies on a network provides opportunities for more advanced device management (e.g., relative to SNMP). Such development allows any network service to report its full service capabilities during the establishment of a connection between the network service and another network service, such as a network server. Thus, service server 110 might communicate with network service 120A using one communications protocol (in order to receive service capabilities data and, optionally, send service jobs or requests) and might communicate with network service 120B using a different communications protocol.

Service server 110 may automatically detect one of network services 120A-E, whether the detection is initiated by service server 110 or the network services themselves. Additionally or alternatively, service server 110 may be notified of one or more of network services 120A-E by an administrator. Upon detection, service server 110 queries the detected network service (local or remote) for information about the network service including, but not limited to, service features and options and other capabilities supported by the network service.

Based on the service capabilities data, service server 110 generates integrated service client 112. Service server 110 then sends integrated service client 112 to one or more of client devices 140A-C. Additionally or alternatively, service server 110 sends the service capabilities data to one or more of client devices 140A-C that (already) execute an integrated service client at the time service server 110 receives the service capabilities data. Such "already-existing" integrated service clients are automatically updated to include the new service capabilities data.

The functionality of service server 110 may be implemented using stored program logic, in a special-purpose computer or loaded from one or more non-transitory media into the memory of a general-purpose computer and then executed.

Client devices 140A-C may be implemented as any type of client device. Examples of client devices 140A-C include, without limitation, personal or laptop computers, workstations, tablet computers, cellular telephony devices such as cell phones, personal digital assistants (PDAs), etc.

Service server 110 builds an information database and creates various data structures (e.g., an XML file) for integrated service client 112. Such data structures may be accessed by UI components of integrated service client 112 when client 112 displays an integrated UI to a user of one of client devices 140A-C.

After integrated service client 112 is received by and installed at client devices 140A-C, service client 112 displays an integrated UI that contains features from multiple network services (e.g., network services 120A-E). Some features on the UI are automatically enabled or disabled based on a feature set a user has previously selected and whether any network services can support the selected feature set. Based on the feature set of the user's selection, service client 112's UI determines which network service will be used, and then saves the feature set to a destination service job ticket. A rendering component of service client 112 sends a service job to a network service (e.g., network service 120C) defined in the service ticket.

The service job ticket is in a form that is recognizable by the target network service. For example, if the network service is a web site, then the service job ticket may be a Uniform Resource Location (URL) that includes parameters and/or other URL components that identify or correspond to selected features and options. In response to receiving the generated URL, the network service provides content (e.g., a web page) that the client device displays in a web browser or a separate application that is dedicated to the network service.

In a related embodiment, instead of generating and sending an integrated service client 112 to each client device 140, service server 110 provides a web service that client devices 140A-C access, for example, via a web browser or a dedicated application. In this way, integrated service client 112 would not have been updated whenever a new network service is discovered or an additional feature is supported by a known network service.

Service Client Components

Figure 2:
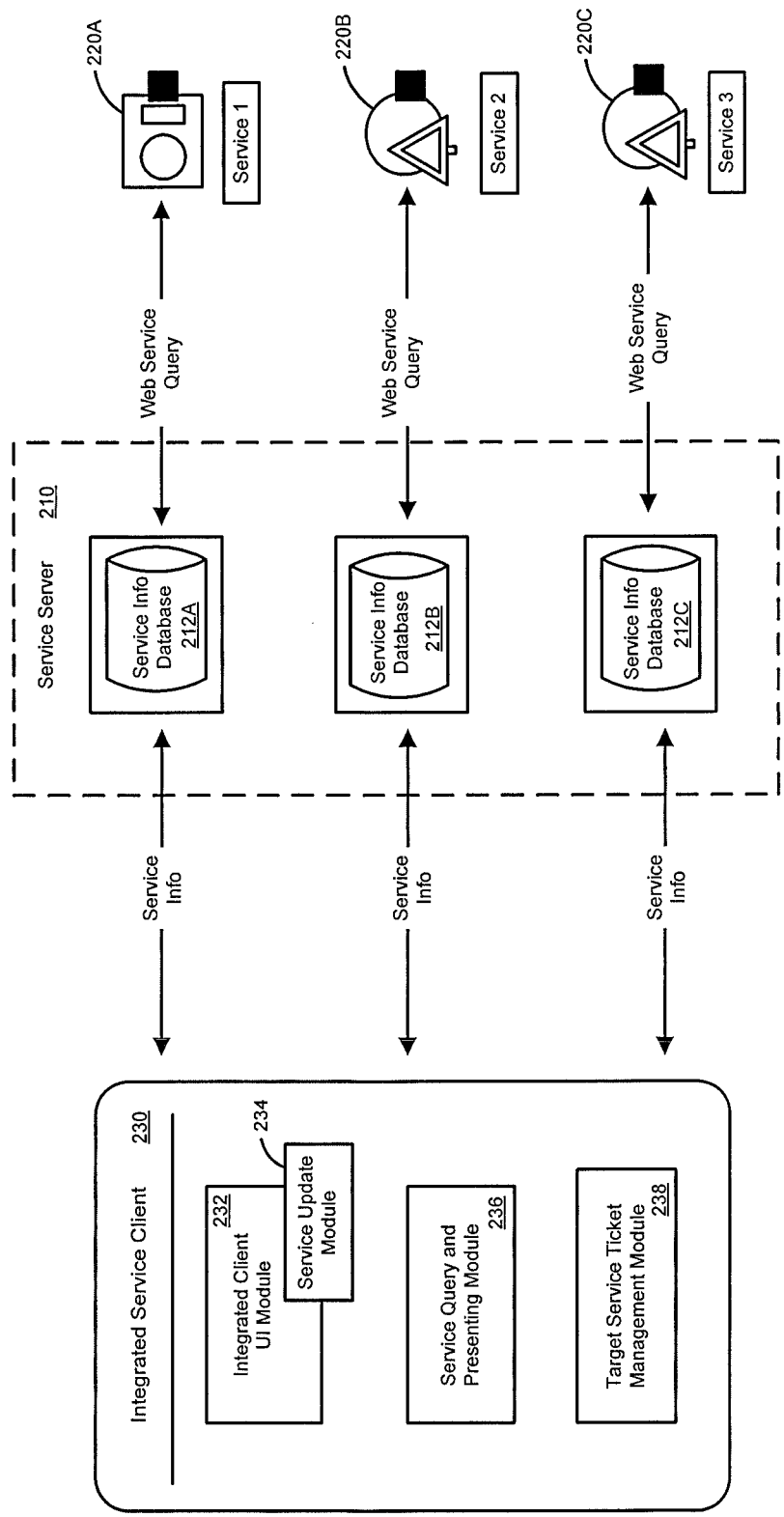
FIG. 2 is a block diagram that depicts example components of a service server and of an integrated service client, according to an embodiment.

FIG. 2 is a block diagram that depicts example components of a service server 210 and of an integrated service client 230, according to an embodiment. Service server 210 may be the same server as service server 110. Service server 210 includes service information databases 212A-C, one for each of network services 220A-C. Thus, service information database 212A contains information about network service 220A, service information database 212B contains information about network service 220B, and so forth. Although depicted as separate databases 212A-C, databases 212A-C may be stored on the same storage device (not depicted).

According to FIG. 2, service server 210 communicates with network service 220A and 220C using Web Services Discovery in order for service server 210 to retrieve information (including features and options) about network service 220A and 220C. Web Service Discovery is one example of a standard discovery protocol that service server 210 and network service 220A and 220C implement, or at least a version thereof. Also, service server 210 communicates with network service 220B using SNMP (or Simple Network Management Protocol).

In FIG. 2, integrated service client 230 executes on a client device and includes four components: integrated UI module 232, update module 234, service query and presenting module 236, and target service ticket management module 238. Integrated UI module 232 generates a user interface (UI) and causes the UI to be displayed on a screen of the client device upon which integrated service client 230 is installed. Update module 234 is responsible for obtaining information from service server 210 about one or more network service that service server 210 discovers after integrated service client 230 is installed on the client device.

Service query and presenting module 236 receives feature selections (whether user selected, default, or a combination of both), determines which network service of multiple network services to use, and generates a service job that reflects the feature selections and, optionally, one or more documents. Service query and presenting module 236 passes the service job to integrated target service ticket management module 238. The service job is reflected in the service request. The format of the service request varies depending on the type of network service and/or the communications protocol required to communicate with the selected network service. For example, if the network service is a web site, then the service request may be reflected in an HTTP request message. If the network service is a web service, then the service request may be reflected in a SOAP message.

Integrated service port management module 238 is responsible for sending the service job to the appropriate network service. Integrated service port management module 238 may implement one or multiple communication protocols in order to send the service job to the appropriate network service. For example, service client 230 might send one service job to a first network service identified in service client 230 via Web Services Device port and service client 230 might send one service job to a second network service identified in service client 230 via a TCP/IP port.

Network Service Information Data Flow

Figure 3:
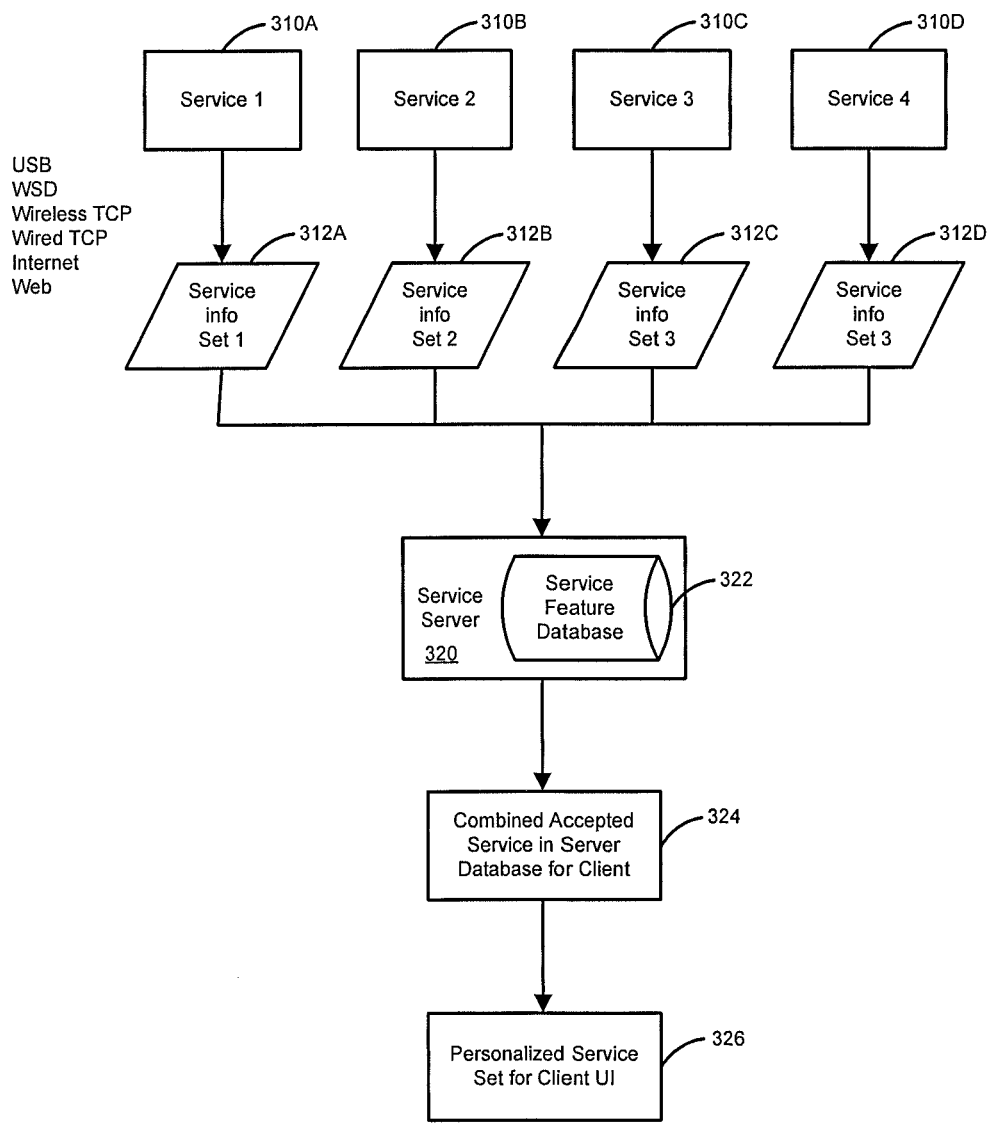
FIG. 3 is a block diagram that depicts a data flow of network service information from multiple network services to a service server, according to an embodiment.

FIG. 3 is a block diagram that depicts a data flow of network service information from multiple network services 310A-D to a service server 320, according to an embodiment. Service server 320 may be the same server as service server 210 and/or service server 110. Each network service 310 sends a set of service information to service server 320. For example, network service 310A sends service information set 312A to service server 320, network service 310B sends service information set 312B to service server 320, and so forth. Network services 310A-D may communicate with service server 320 using one of communication methods, such as USB (or Universal Serial Bus), wireless TCP, and wired TCP, or the Internet. Although FIG. 3 depicts four network services 310A-D, other embodiments may include more or fewer network services.

Service server 320 receives service information sets 312A-D and, in an embodiment, applies one or more filter criteria to service information sets 312A-D. The one or more filter criteria may be used to identify which network services are not allowed to be used (or "seen") by client devices that are connected to service server 320. In this embodiment, service server 320 compares the one or more filter criteria to one or more attributes of a network service (e.g., 310A), which are reflected in a service information set (e.g., 312A) received from that network service. Example filter criteria include whether the network service supports a certain security policy or any security, whether the network service supports a particular page description language (PDL), or whether the network service is from a particular domain or subdomain. Additionally or alternatively, one or more filter criteria includes a list of network services that are allowed to be used by client devices that are connected with service server 320 (e.g., a "white" list) or a list of network services that are not allowed to be used by client devices that are connected to service server 320 (e.g., a "black" list).

The one or more filter criteria may be established by a company administrator, or an administrator that is authorized by a business entity that owns and/or manages service server 320.

If a network service is not "filtered out" after the filter stage, then service server 320 stores the service information set of that network service in a service feature database 322. The data stored therein is referred to as the server generic service description data (or "Server GSDD"). The Server GSDD, on a server when a client device is connecting to a corporate domain network, or on the client device when the client device is disconnected from a corporate domain network, defines information on all network services (whether connected or not connected) that are available for all users of that client device.

In an embodiment, service information sets of network services that are "filtered" out after the filter stage are stored separate from the Server GSDD. Such storage may be on the same storage device that stores on the Server GSDD or on a different storage device. Such service information sets may be maintained if, for example, the one or more filter criteria are later changed or updated, for example through user input. In such a scenario, the "excluded" service information sets may be evaluated again based on the updated filter criteria. Such a re-evaluation might be triggered based on the changing of the one or more filter criteria. One or more of the excluded service information sets might then pass the filter stage and end up being stored as part of the Server GSDD.

In an embodiment, the Server GSDD may be filtered based on one or more additional filter criteria. Such additional criteria may be established by a client administrator, who may be the same or different than the administrator that defines the filter criteria referenced above. Examples of such additional filter criteria include those criteria described previously and whether a particular user is allowed to use a particular network service, which may be determined in multiple ways, such as a pre-defined list of network services that the particular user is allowed to use. The service information sets of network services that are not "filtered out" by this additional filter criteria are referred to as "Client GSDD." Client GSDD 324 is a subset of the Server GSDD and defines information on all network services (whether connected or not) that are available for a particular user. Thus, each client device that is communicatively coupled to (or registered with) service server 320 might receive a different Client GSDD. For example, the Server GSDD may include information only about network services 310A-C and not network service 310D. Afterward, Client GSDD 324 for one client device might include information only about network services 310A-B while Client GSDD 324 for another client device might include information only about network services 310A and 310C.

The Client GSDD 324 of a particular user becomes part of an integrated service client (whether generated by service server 320 or another entity) that is installed on a client device of the particular user. Alternatively, in a non-client scenario, client GSDD 324 is stored for each client device. If multiple client devices are associated with the same network services, then a single client GSDD may be associated with the multiple client devices.

In an embodiment, the Client GSDD 324 is filtered by one or more filter criteria that are defined by the associated user. For example, the associated user might indicate that s/he only wants to see information about network services that are of a particular type (e.g., educational, entertainment), that are free, and that provide video content. Whichever service information sets satisfy the filter criteria defined by the user will be part of a "UI GSDD" 326. The UI GSDD 326 for a particular user defines information on all connected network services that are available for the particular user. The UI GSDD 326 may be updated in real-time as the particular user makes selections about what characteristics or attributes a set of network services must have in order to be candidate network services for service jobs that are initiated by the particular user.

"Adding" a New Network Service to a Service Server

A network service is "added" to a service server when a service server obtains details about the network service, such as an address (e.g., IP or MAC) of the network service, communication protocol(s) that the network service supports, and set of features and options that the network service supports.

Figure 4:
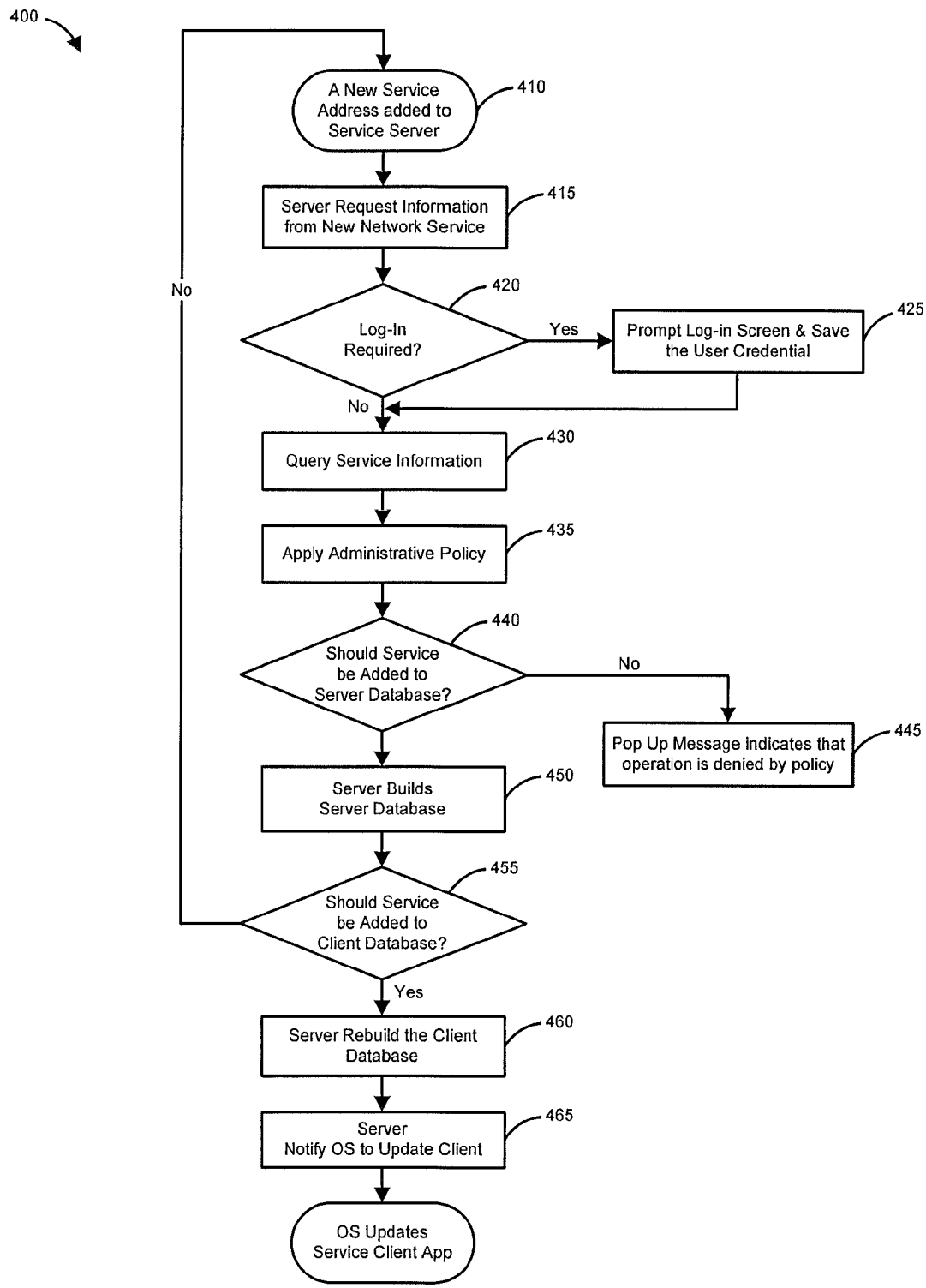
FIG. 4 is a flow diagram that depicts a process for adding a connected network service to a service server, according to an embodiment.

FIG. 4 is a flow diagram that depicts a process 400 for adding a connected network service to a service server, according to an embodiment. At step 410, a user provides, to service server, input about a new network service. Such input might include a network IP, an Internet IP or a MAC address of the network service. The network service may be local to (i.e., on the same network as) or remote to (i.e., not on the same network as) the service server.

Alternatively, step 410 comprises the service server automatically detecting the new network service. Such automatic detection may be achieved in multiple ways. For example, upon the new network service entering the network, the new network service implements a Web Services Discovery specification by transmitting a HELLO multicast message to devices on the network. The service server receives the HELLO message, responds with a message that identifies the service server. If both the service server and the new network service implement a Web Services Metadata Exchange specification, then the service server sends a metadata request message to the new network service in order to retrieve information about how to request certain information about the new network service, such as capabilities data.

At step 415, the service server sends a request to query the new network service for certain information, such as capabilities data of the network service, any security protocols the network service supports, etc.

At step 420, it is determined whether a log-in is required. If so, then process 400 proceeds to step 425 where a log-in screen is displayed and user credential information is saved, after which process 400 proceeds to step 430. If a log-in is not required, then process 400 proceeds to step 430, where the service server queries the service information of the new network service.

At step 435, the service server applies an administrative policy to at least some of the information retrieved from the network service. The administrative policy may indicate that the network service must support a certain type of secured connection and that the network service appears on trusted service provider list.

At step 440, the service server determines, based on the administrative policy, whether the network service should be added to the Server GSDD. If not, then process 400 proceeds to step 445, where the service server causes a message to be displayed that indicates that the "add" operation is denied. If the service server determines that the network service should be added to the Server GSDD, then process 400 proceeds to step 450.

At step 450, the service server builds the Server GSDD database. This step may comprise adding the retrieved information about the new network service to the Server GSDD database.

At step 455, the service server uses another policy to determine whether the new network service should be added to a client GSDD. The other policy may be defined by a client administrator and determines whether a client device is able to "see" certain network services. If the result of step 455 is in the negative, then process 400 proceeds to a point prior to step 410, indicating that further input regarding a new network service is required to proceed. If the result of step 455 is in the affirmative, then process 400 proceeds to step 460.

At step 460, the service server rebuilds a Client GSDD. This step may comprise adding the retrieved information about the new network service to an existing Client GSDD.

At step 465, the service server sends the retrieved information to an operating system of a client device that executes a service client. At step 470, the operating system updates the service client based on the retrieved information. Alternatively, a user might decide to update the service client at a later time.

Creating User Interface Data

Figure 5:
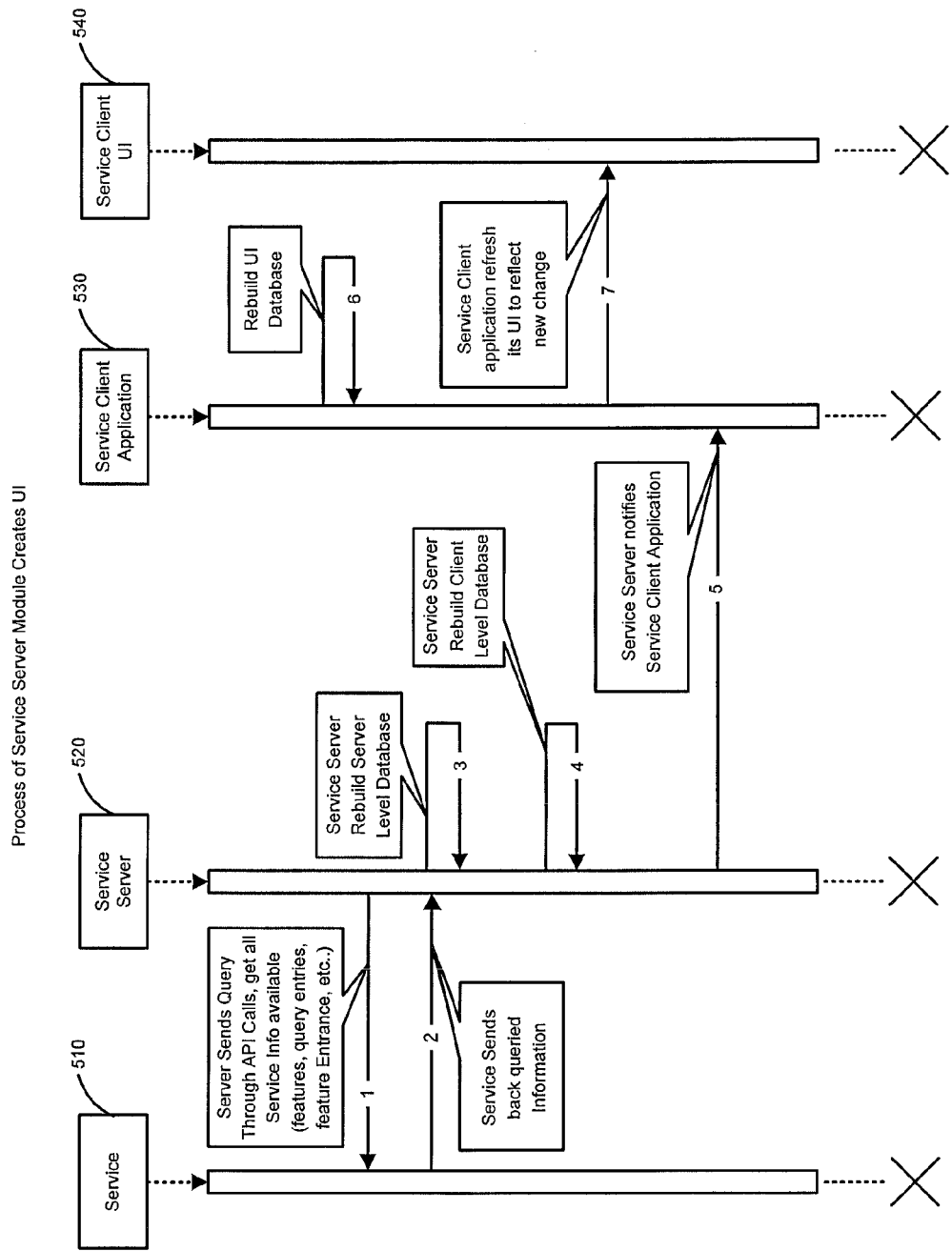
FIG. 5 is a sequence diagram that depicts a process for creating user interface data, according to an embodiment.

FIG. 5 is a sequence diagram that depicts a process 500 for creating user interface data, according to an embodiment.

At step 1, a service server 520 sends one or more queries to network service 510 in order to receive information about network service 510, including capabilities of network service 510. One or more techniques may be used to send the one or more queries, including, but not limited to, a WS Discovery query, OS network API, etc.

At step 2, network service 510 sends, to service server 520, the information that service server 520 requested.

At step 3, service server 520 checks one or more company or domain administrative policies and builds (or rebuilds) a Server GSDD based on the retrieved information.

At step 4, service server 520 checks a client policy and builds (or rebuilds), based on the retrieved information, a Client GSDD for each user that is authorized to use network service 510.

At step 5, service server 520 sends the retrieved information to one or more service clients 530 via, for example, an OS of each client device of the one or more corresponding client devices. An OS, in turn, notifies a client update module that is part of the service client 530.

At step 6, service client 530 rebuilds an existing UI GSDD.

At step 7, service client 530 updates the client's UI to reflect the one or more features of the new network service 510. If a client UI module of service client 530 is already processing a job, then service client might include adequate solutions to ensure that the new UI update does not affect existing service jobs.

Example GSDD

FIG. 6 is a block diagram that depicts example generic service description data for each of a server, a client, and a user interface, according to an embodiment. FIG. 6 depicts an example Server Database (or GSDD) 610, an example Client Database 620, and an example Client UI Database 630. Although databases 610-630 are in an XML format, embodiments are not limited to GSDDs in an XML format. Alternative formats are possible.

In this example, each of databases 610-630 include the same information of a network service, such as attributes of the network service (e.g., name, IP address, payment type, category type, connection type, ID, etc.) and capabilities data that includes three feature options. Also, each of databases 610-630 includes a different value for the ServiceData Value. Specifically, Server Database 610 indicates "Server level" as the value for the ServiceData Value, Client Database 620 indicates "Client Level" as the value for the ServiceData Value, and Client UI Database 630 indicates "UI level" as the value for the ServiceDataValue.

Example Service Client User Interface

FIG. 7 is a block diagram that depicts an example user interface 700, according to an embodiment. User interface 700 may be generated by a UI module of a service client. Alternatively, user interface 700 is provided by a web server hosted by service server 110. A web browser on a client device may request user interface 700 from the web server over a network. Alternatively, a client device executes a non-browser application (e.g., a "smartphone" application) that requests user interface 700 from service server 110 over network. Regardless of how user interface 700 is displayed on a client device, the data used to populate user interface 700 may originate from a UI GSDD.

User interface 700 comprises four parts or regions: service selection filter preference 710, a service feature/option list 720, a service provider list 730, and a service feature set 740.

Service selection filter preference 710 defines service attributes/characteristics that are used to exclude some network services that a user does not intend to use. The service preferences of a network service (such as the type of connection or name of service provider) are not related to the actual service(s) that the network service provides. In contrast, service features/options are related to what a network service provides.

For example, a user may select "IP List Approved by Company" from the "Connection" preference as a filter, which causes only service providers that are listed on the "IP List" to be displayed as possible service providers in service provider list 730. If one or more service providers are excluded as a result of that user selection, then service feature/option list 720 may be dynamically updated to reflect the new (updated) set of potential service providers.

In the depicted example, the service preferences are that the network service may have any type of connection, may have any type of security, may have any type of log-in credentials, must be from the Spelling Translation and/or Child Education categories, may be any service provider, and must be a free service. However, if the "Any Services" filter preference is selected, then user interface 700 may be dynamically updated to list all network services in service provider list 730 (unless some features/options are already selected in service feature/option list 720) and all possible service features/options in service feature/option list 720.

Service feature/option list 720 lists multiple (or all) features and options supported by a set of one or more network services that are determined based on a set of selection preferences selected by a user (and/or by default). In an embodiment, each time a user changes a feature or option from service feature/option list 720, the resulting set of features is validated by a service client against the capabilities of potential network services (e.g., those indicated in a Client GSDD). If a network service does not support the resulting set of features, then all of that network service's features are disabled in service feature/option list 720. However, if there is a network service that does support the resulting set of features, then all of that network service's features are enabled in service feature/option list 720.

In this example, service feature/option list 720 divides service features into five main types: Grade, Academic, Activities, Tutoring, and Event Service. The feature Academic is selected along with the option "Book." Also, the feature Tutoring is selected along with the option "Learn to Read."

Service provider list 730 lists one or more (or all) network services that are within a set of possible destination network services after the user's preferences are defined in service selection filter preference 710 and service features are selected in service feature/option list 720. In the depicted example, five network services are listed in service provider list 730. In other words, the five listed network services are identified, from among a larger set of service providers, as satisfying all the selected (whether user-selected and/or default-selected) requirements.

In an embodiment, selection of one of the network services listed in service provider list 730 causes a web browser to be directed to that network service. In an embodiment, the request for the network service includes one or more features/options that were selected from service feature/option list 720. For example, for a web service, an HTTP request is generated that includes one or more parameters that correspond to one or more of the selected features/options. In this way, a user may be presented with the exact information that the user is seeking without requiring the user to further select one or more features/options (at the selected network service) that the user already selected in user interface 700.

Service feature set 740 lists all the features and options provided by the service providers listed in service provider list 730. The features and options listed in service feature set 740 may decrease if the number of service providers listed in service provider list 730 decreases (e.g., due to a selection in service selection filter preference 710 or in service feature/option list 720). Conversely, the features and options listed in service feature set 740 may increase if the number of service providers listed in service provider list 730 increases (e.g., due to a selection in service selection filter preference 710 or in service feature/option list 720).

User interface 700 also includes five buttons: Add Service button 750, Delete Service button 760, Auto Detection button 770, Customize Selection button 780, and Update from Provider button 790. In an embodiment, one or more of these buttons are only displayed to an administrator, or a user with administrator rights, not any end-user. Selection of Add Service button 750 allows a user (or administrator) to manually add a new network service, for example, to a Service GSDD or a Client GSDD. Selection of Delete Service button 760 allows a user (or administrator) to manually delete a network service, for example, from a Service GSDD or a Client GSDD. Selection of Auto Detection button 770 causes a service client or a service server to send a HELLO message on a certain (e.g., local) network. The type of messages that may be sent is communication protocol dependent. Selection of Customize Selection button 780 allows a user (or administrator) to update (e.g., add or remove) service selection filter preference 710. Selection of Update from Provider button 790 causes a service client or a service server to require one or more network services, for example, that are listed in a Service GSDD or a Client GSDD.

Changing a Selection Filter Preference

Figure 8:
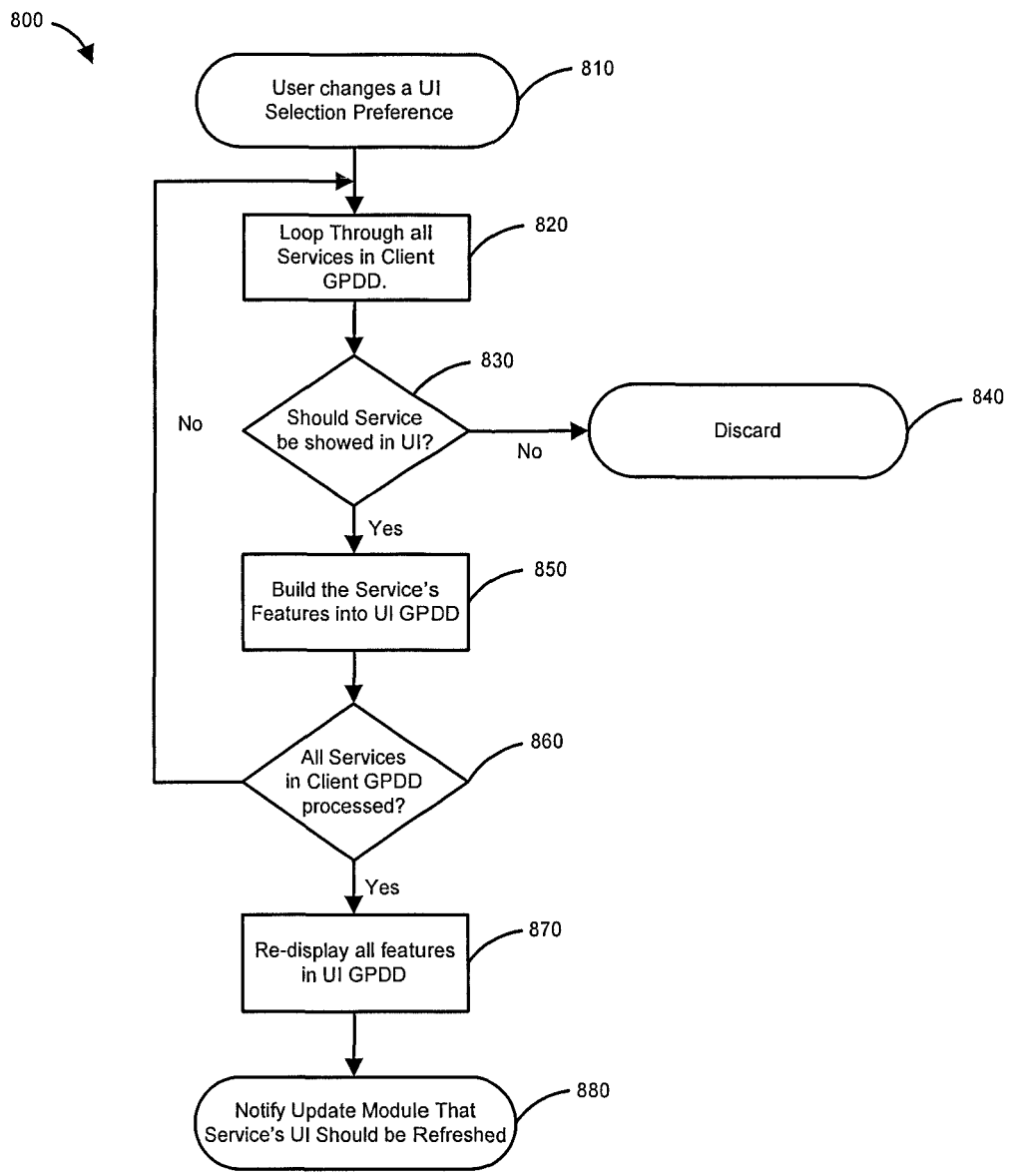
FIG. 8 is a flow diagram that depicts a process for a user changing a filter preference, according to an embodiment.

FIG. 8 is a flow diagram that depicts a process 800 for a user changing a filter preference, according to an embodiment. Process 800 may be performed by one or more components or modules of a service client, such as service update module 234 depicted in FIG. 2. Alternatively, process 800 may be performed by a service server, such as service server 220 in FIG. 2. Thus, while process 800 is described from the perspective of a client application, embodiments are not so limited.

At step 810, a user changes a UI selection preference. Examples of UI selection preferences include, but are not limited to, location (e.g., URL or IP address), security information, and fee-based service. The user might change the UI selection preference through a UI generated by a service client. As a result of performing step 810, the service client might delete all UI GSDD and rebuild it using the following process. Alternatively, the service client might delete, from a UI GSDD one at a time, only information about a network service that the service client determines should not be included in the UI GSDD based on the user's selection preference.

At step 820, the service client identifies a network service indicated in a Client GSDD to which the service client has access. The Client GSDD may be stored on the same client device that executes the service client.

At step 830, the service client determines whether the network service identified in step 820 should be displayed in a user interface that a user uses to select features and options for a particular service job. This determination may be made by comparing the current set of selection preferences with attributes/characteristics of the identified network service or by comparing just the changed preference with such attributes/characteristics. If step 830 results in the negative, then process 800 proceeds to step 840, where information about the identified network service is not included in (e.g., deleted from) the UI GSDD. If step 830 results in the affirmative, then process 800 proceeds to step 850.

At step 850, the service client adds the network service's capabilities (i.e., features and options) into a UI GSDD, from which the service client eventually generates a user interface.

At step 860, the service client determines whether information about each network service indicated in the Client GSDD has been analyzed. If not, then process 800 proceeds to step 820. Otherwise, process 800 proceeds to step 870.

At step 870, the service client causes all (or many) features and options indicated in the updated UI GSDD to be re-displayed on the client. Only the features and options of network services that are identified in the UI GSDD are displayed. Thus, information about any network services that were not included in the UI GSDD in step 850 is not displayed to a user of a client device that executes the service client.

At step 880, one or more applications that are currently using this service client are notified, e.g., by the service client.

Changing UI Feature/Option

The selection of features and options under an integrated service client approach is different compared to other service clients. To support multiple devices in one user interface, the integrated service client should ensure that every feature set selection by a user is supported by at least one network service. Constraints to features are applied according to service support by any services. In other words, if none of the network services indicated in a UI GSDD supports a particular feature, then that particular feature appears disabled.

Figure 9:
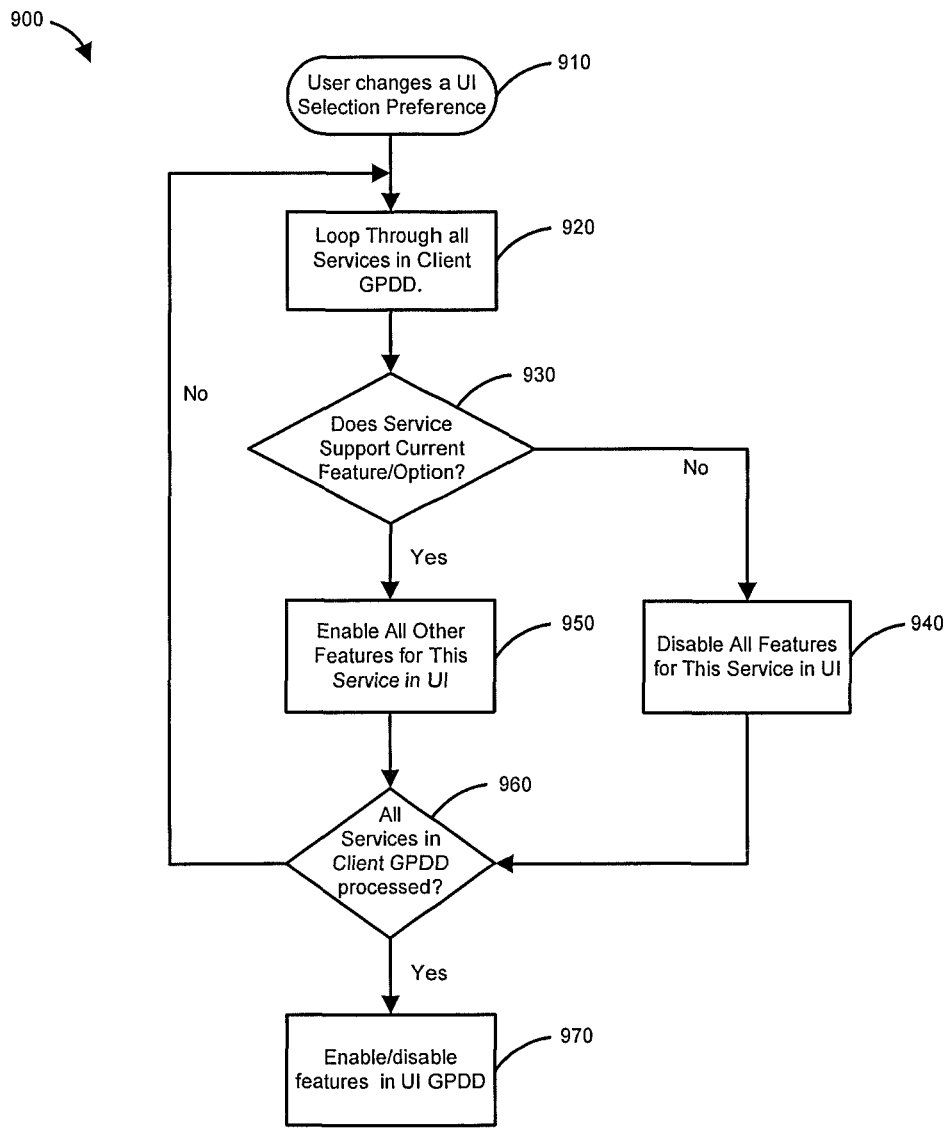
FIG. 9 is a flow diagram that depicts a process for a user changing a feature/option on a user interface (UI) of a service client, according to an embodiment.

FIG. 9 is a flow diagram that depicts a process 900 for a user changing a feature/option on a user interface (UI) of a service client, according to an embodiment. Process 900 may be performed by one or more components or modules of a service client, such as integrated client UI module 232 depicted in FIG. 2. Alternatively, process 900 may be performed by a service server, such as service server 220 in FIG. 2. Thus, while process 900 is described from the perspective of a client application, embodiments are not so limited.

At step 910, the UI receives, from a user, input that indicates a change in a feature or option. Examples of a change include selecting the "Field Trips" option in the Activities feature of user interface 700.

At step 920, the service client identifies a network service indicated in a Client GSDD. If there are more than one network service identified in the Client GSDD, then the service client might "loop through" each identified network service. In other words, steps 920-960 will be performed for each identified network service.

At step 930, the service client determines whether the network service identified in step 920 supports the feature/option selected in step 910. If not, then process 900 proceeds to step 940. If so, then process 900 proceeds to step 950.

At step 940, the service client disables all features of the network service identified in step 920 if the network service does not support the feature/option set previously selected by user.

At step 950, the service client enables all features for this network service in the UI if the feature set previously selected by user is supported by the network service.

At step 960, the service client determines whether all network services have been identified in the Client GSDD. If not, then process 900 proceeds to step 920 to identify another network service. Otherwise, process 900 proceeds to step 970.

At step 970, for each feature enabled/disabled in the UI, the service client enables or disables that feature in a UI GSDD. Thus, if feature 1 is enabled in the UI, then the service client enables feature 1 in the UI GSDD. Conversely, if feature 2 is disabled in the UI, then the service client disables feature 2 in the UI GSDD.

Confirm UI Selection

Figure 10:
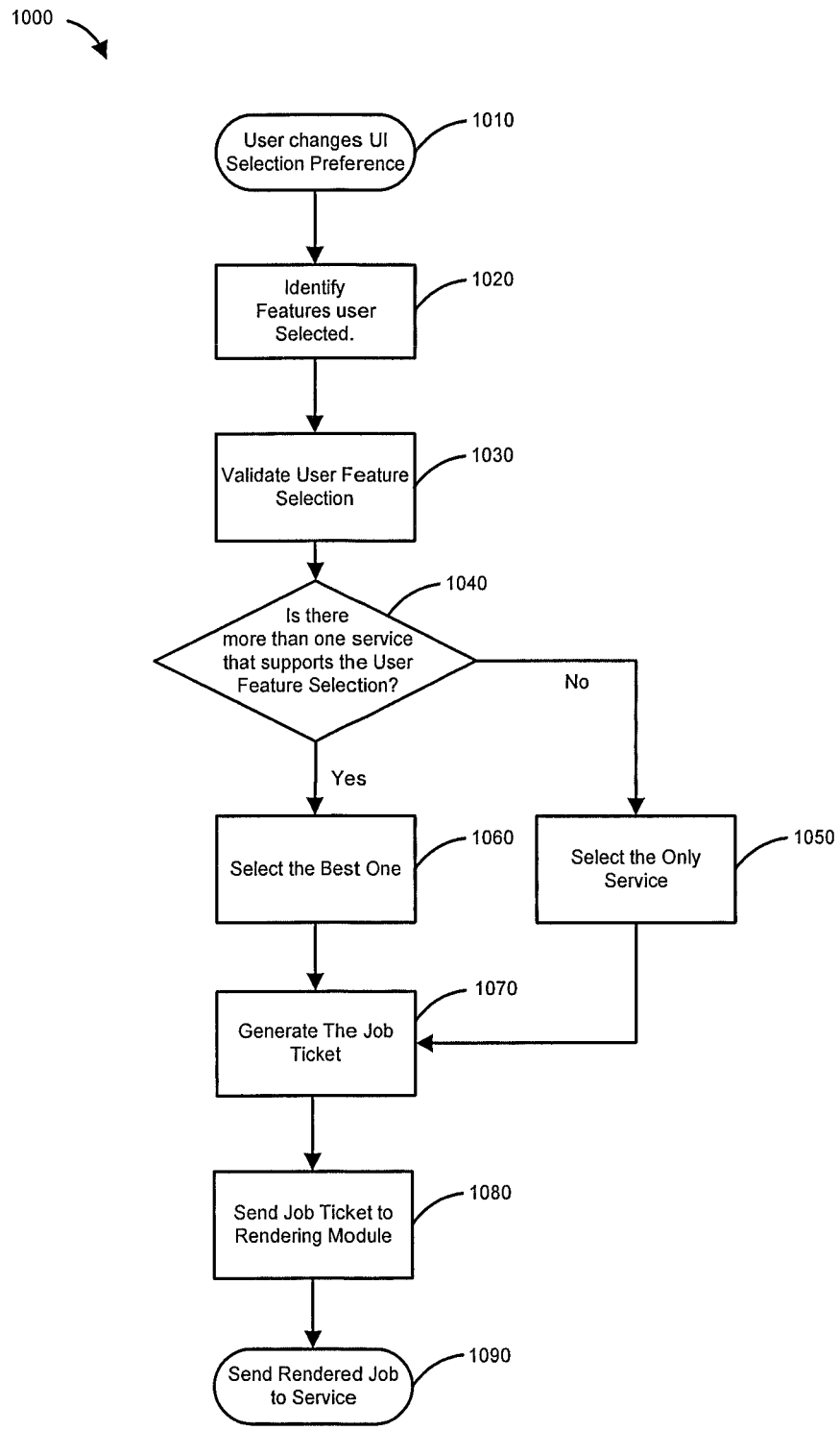
FIG. 10 is a flow diagram that depicts a process for validating user selections of features of options, according to an embodiment.

FIG. 10 is a flow diagram that depicts a process 1000 for validating user selections of features of options, according to an embodiment. Process 1000 may be performed by a service client, such as integrated service client 112. Process 1000 may be performed by one or more components or modules of a service client, such as service query and presenting module 236 and target service ticket management module 238 depicted in FIG. 2. Alternatively, process 1000 may be performed by a service server, such as service server 220 in FIG. 2. Thus, while process 1000 is described from the perspective of a client application, embodiments are not so limited.

At step 1010, a service client receives, from a user, input that indicates confirmation of the features and options selected for a service job. The input may be the user selecting an "OK" button. This step may be performed by a UI module of the service client, such as UI module 232 of service client 230 of FIG. 2.

At step 1020, the service client identifies all features and options that are selected for the service job. Some of the features and options may have been selected by the user while other features and options may have been default selections. Such default selections may have been established in code of the service client and/or established by the user in a previous service selection session. For example, a prior service job includes a set of features and options and those features and options are default selections (as indicated in the client's UI) for the current service job, i.e., before the user has viewed the UI.

At step 1030, the service client validates the selected features and options of the service job. For example, if a user selects an feature/option that is not supported by any network service, then the service client may inform the user to change the value before sending a service request to a selected network service.

At step 1040, the service client determines whether more than one network service supports the set of selected features and options. If not, then at step 1050, the service client selects the one network service. Otherwise, process 1000 proceeds to step 1060.

At step 1060, the service client selects a particular network service among the multiple network services that are capable of processing the service job according to the selected set of features and options. This selection may be based on determining which of the multiple network services is free, which provides the most secured connection, which does not require log-in credentials, or any other factor, such as which network service was added most recently, or which network service has the best reputation according to some standard.

At step 1070, the service client generates a service job ticket based on the selected features and options.

At step 1080, the service client sends the service job ticket to a query and presenting module of the service client, such as service query and presenting module 236 of service client 230 of FIG. 2. The query and presenting module may be implemented as a single module or as multiple modules that each might perform a different type of querying and presenting. Like step 1010, steps 1020-1080 may be performed by a UI module of the service client, such as UI module 232 of service client 230 of FIG. 2. The rendering module converts (1) document data received from and generated by an application (e.g., a Microsoft Word) executing on the client device into (2) print data that the network service is configured to be able to process. The service client might automatically detect the PDL supported by the destination network service and render the job accordingly. For example, the service client might identify an appropriate sub-module that is configured to perform the rendering that is appropriate for the destination network service and cause that sub-module to process the document data to produce the print data in the appropriate format. As another example, the rendering module of the service client might render the service job into a universal format, such as a Bitmap image.

At step 1090, the service client sends the service job, which includes the job ticket and the rendered print data, to the network service selected in step 1050 or step 1060. This step may be performed by a port management module of the service client, such as integrated service port management module 338 of FIG. 3.

Service Ticket Creation

Figure 11:
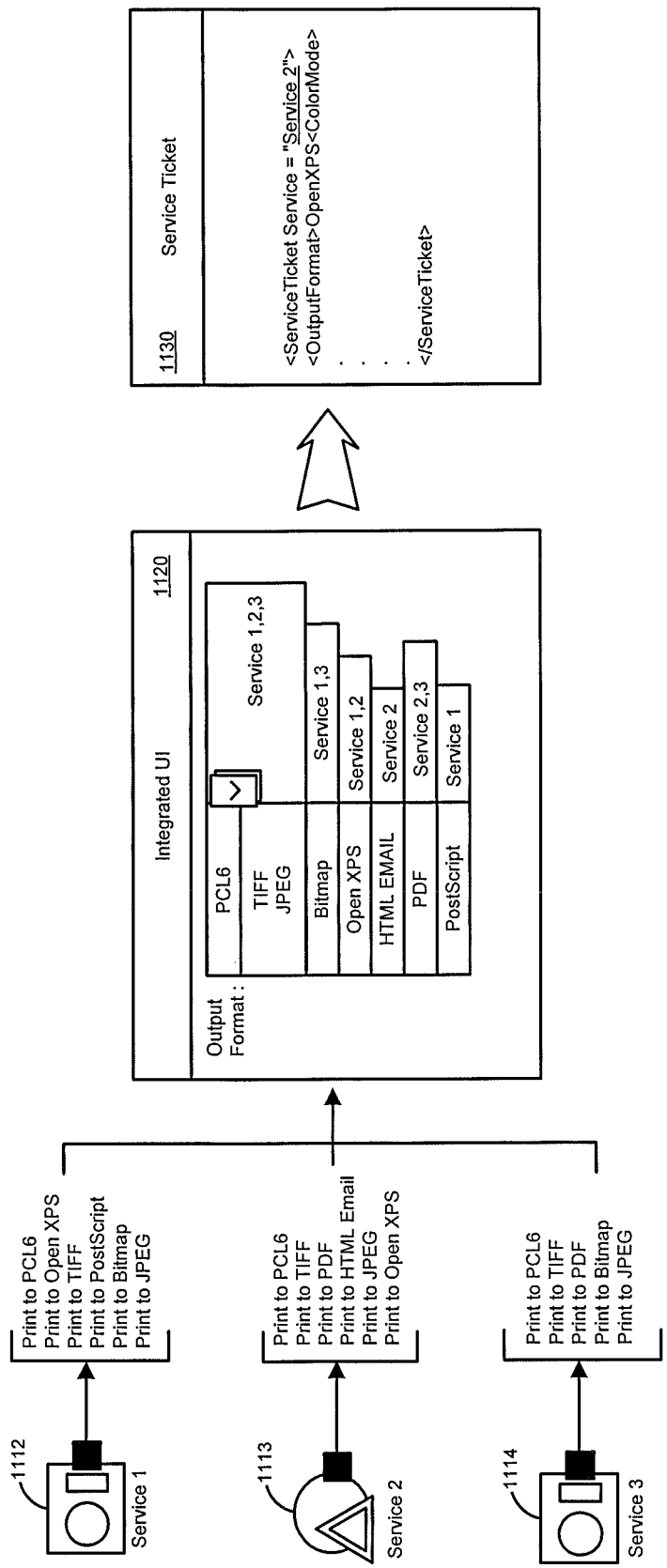
FIG. 11 is a flow diagram that depicts an example of how a service ticket is created, according to an embodiment.

FIG. 11 is a flow diagram that depicts an example of how a service ticket 1130 is created, according to an embodiment. In this example, services 1112-1116 are print services. One of the features of each of services 1112-1116 is output format. Each of services 1112-1116 supports a different set of options for the output format feature. In the depicted example, service 1112 supports printing to PCL6, Open XPS, TIFF, PostScript, Bitmap, and JPEG while service 1116 supports printing to PCL6, TIFF, PDF, Bitmap, and JPEG.

The options supported by each of services 1112-1116 may be reflected in a UI GSDD, from which is generated integrated UI 1120. Integrated UI 1120 may be generated by a service client application executing on a client device or may be provided, over a network, from a service server that executes remote relative to the client device that displays integrated UI 1120.

In the depicted example, integrated UI 1120 displays 11 different options for the output format feature. A user selects "Open XPS" displayed in the drop down menu of integrated UI 1120. Based on this selection (and one or more other selections), service ticket 1130 is generated.

Service ticket 1130 may be generated by a service client executing on a client device or by a service server executing on a device that is remote relative to the client device that displays integrated UI 1120. Service ticket 1130 indicates that "Service 2" (or service 1114) was selected and that the output format is Open XPS.

Adding a Service Provider to a Service Server

Figure 12:
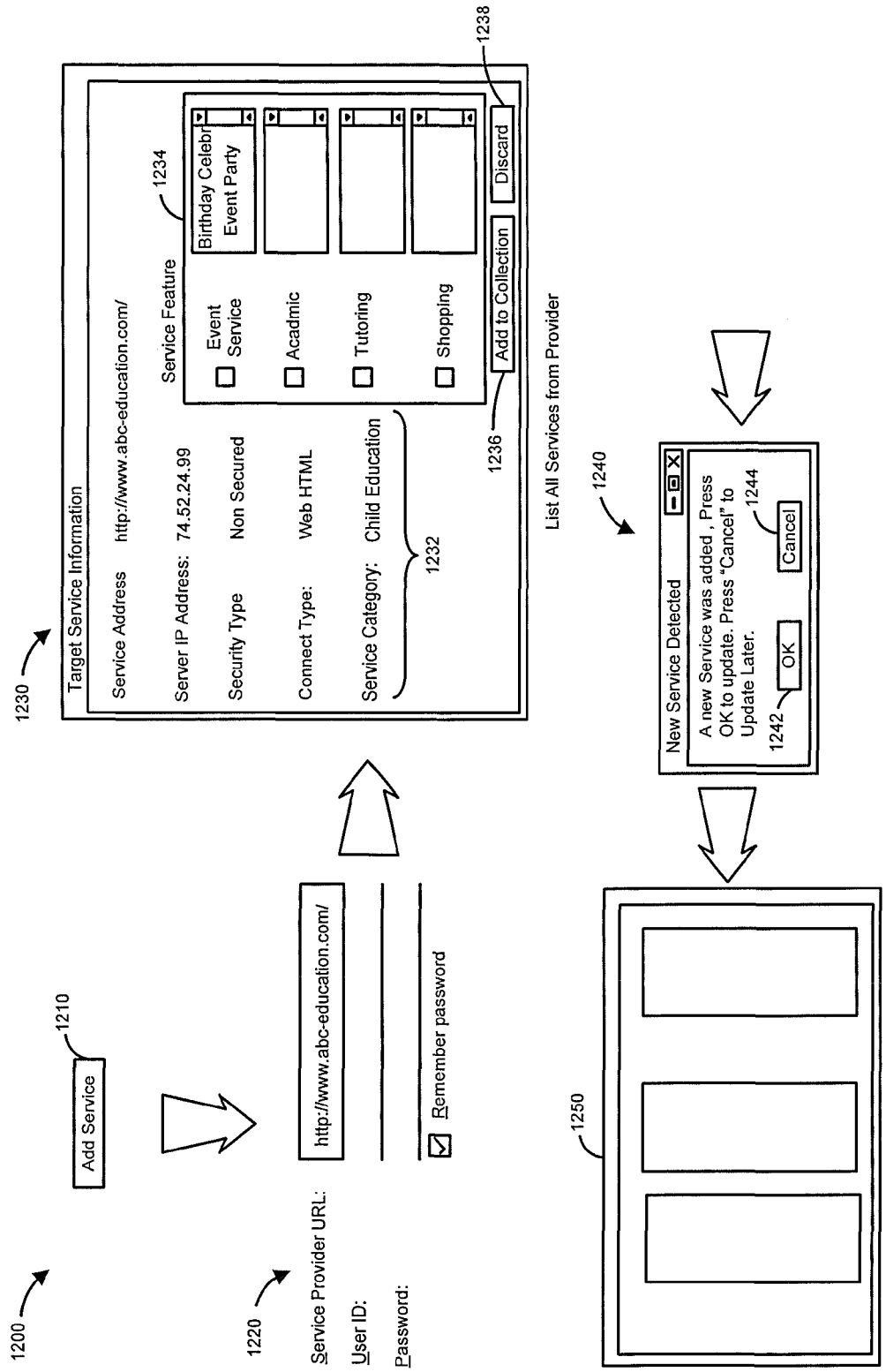
FIG. 12 is a diagram that depicts an example process for adding a service provider to a service server.

FIG. 12 is a diagram that depicts an example process 1200 for adding a service provider to a service server, according to an embodiment. In this example, process 1200 begins by a user (or, more specifically, an administrator) selecting an Add Service button 1210, which may be the same as Add Service button 750 displayed in user interface 700. Selection of Add Service button 1210 causes a window 1220 to be displayed that includes three text fields: a service provider URL text field, a User ID text field, and a Password text field. Window 1220 also includes an option for the client application that provides window 1220 to remember a password that a user enters in the Password text field. Upon entering of the required information, window 1230 is displayed.

Window 1230 includes service attribute information 1232, feature set 1234, an Add to Collection button 1236, and a Discard button 1238. Service attribute information 1232 indicates a URL address of a particular service, an IP address of the particular service, the security type of the particular service, the connection type of the particular service, and the category of the particular service. Feature set 1234 indicates at least four features of the particular service: an Event Service feature, an Academic feature, a Tutoring feature, and a Shopping feature. Each feature is associated with multiple options, such as Birthday Celebration, Event Party, and Graduate Celebration for the Event Service feature.

Selection of Add to Collection button 1236 causes the particular service to be added to a database, such as a Service GSDD or a Client GSDD. Selection of Discard button 1238 causes window 1230 to disappear and, thus, prevents the particular service from being added to the database.

In the depicted example, Add to Collection button 1236 is selected, which causes window 1240 to be displayed. Window 1240 indicates that the particular service, described in window 1230, was added. Window 1240 includes two buttons: an OK button 1242 and a Cancel button 1244. Selection of OK button 1242 causes a user interface (such as user interface 700) to be updated immediately and, optionally, a UI GSDD to be updated immediately. Selection of Cancel button 1244 causes the user interface to be updated later, rather than immediately.

After window 1240 is displayed, window 1250 is displayed (e.g., in response to selection of OK button 1242). Window 1250 displays a user interface, similar to user interface 700. The user interface may include information about the particular service added during process 1200.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
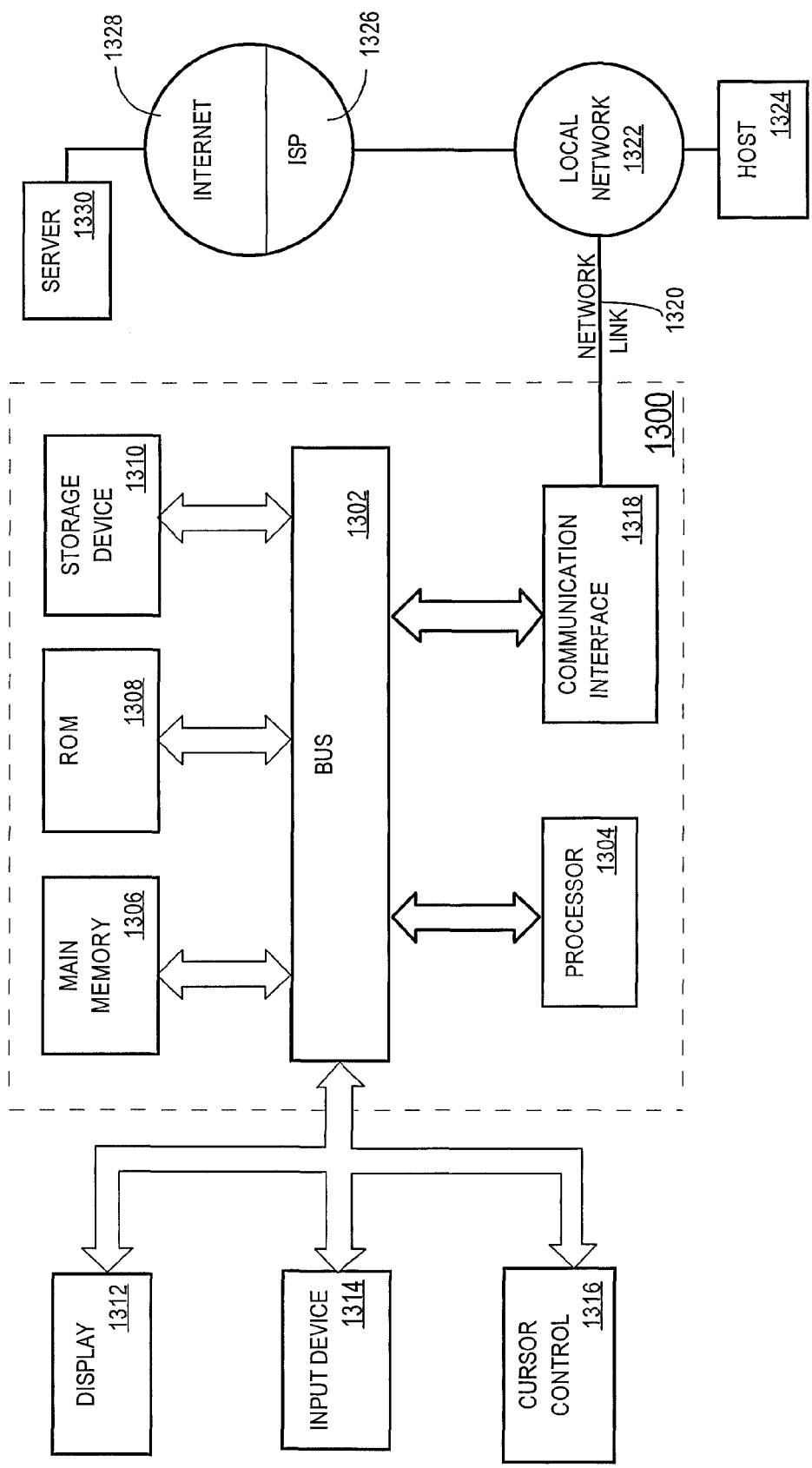
FIG. 13 is a block diagram that depicts a computer system upon which an embodiment may be implemented.

For example, FIG. 13 is a block diagram that depicts a computer system 1300 upon which an embodiment may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

Providing Service Workflows Through Devices

In some situations, users to not have access to all services currently offered by devices. This may occur for a variety of reasons. For example, when a device is initially placed into service, service applications may not be available for all of the services supported by the device. Users often rely upon third parties to develop service applications and service applications are not always immediately available for new service and/or new devices. Some basic device services, e.g., printing, scanning, faxing, etc., are often supported by standard service applications, but non-standard services often require special service applications. As another example, new services may be added to a device currently in service and service applications may not be available for the new services.

An approach is provided for providing service workflows through devices. The approach automatically generates and provides service applications for devices. A service server determines that a service is available for a particular network device. The service may be a new service or an existing service. The service server may make this determination in a variety of ways. For example, the service server may be notified that the new service is available for the particular network device, either by the particular network device or by another source. As another example, the service server may query the particular network device to determine that the service is available for the particular network device.

In response to determining that the service is available for the particular network device, the service server obtains service information from the particular network device. The service information defines, for the service, at least one or more user interface attributes, one or more service parameters and service logic. The service server generates, based upon the service information, a service application that implements the service. The service application allows a user to use the service available for the device. The service server may receive, from a client device, a request to use the service for the particular device. In response to the request, the service server provides to the client device the service application that implements the service. This approach provides users access to services on devices that the users may not otherwise be able to access.

Figure 14:
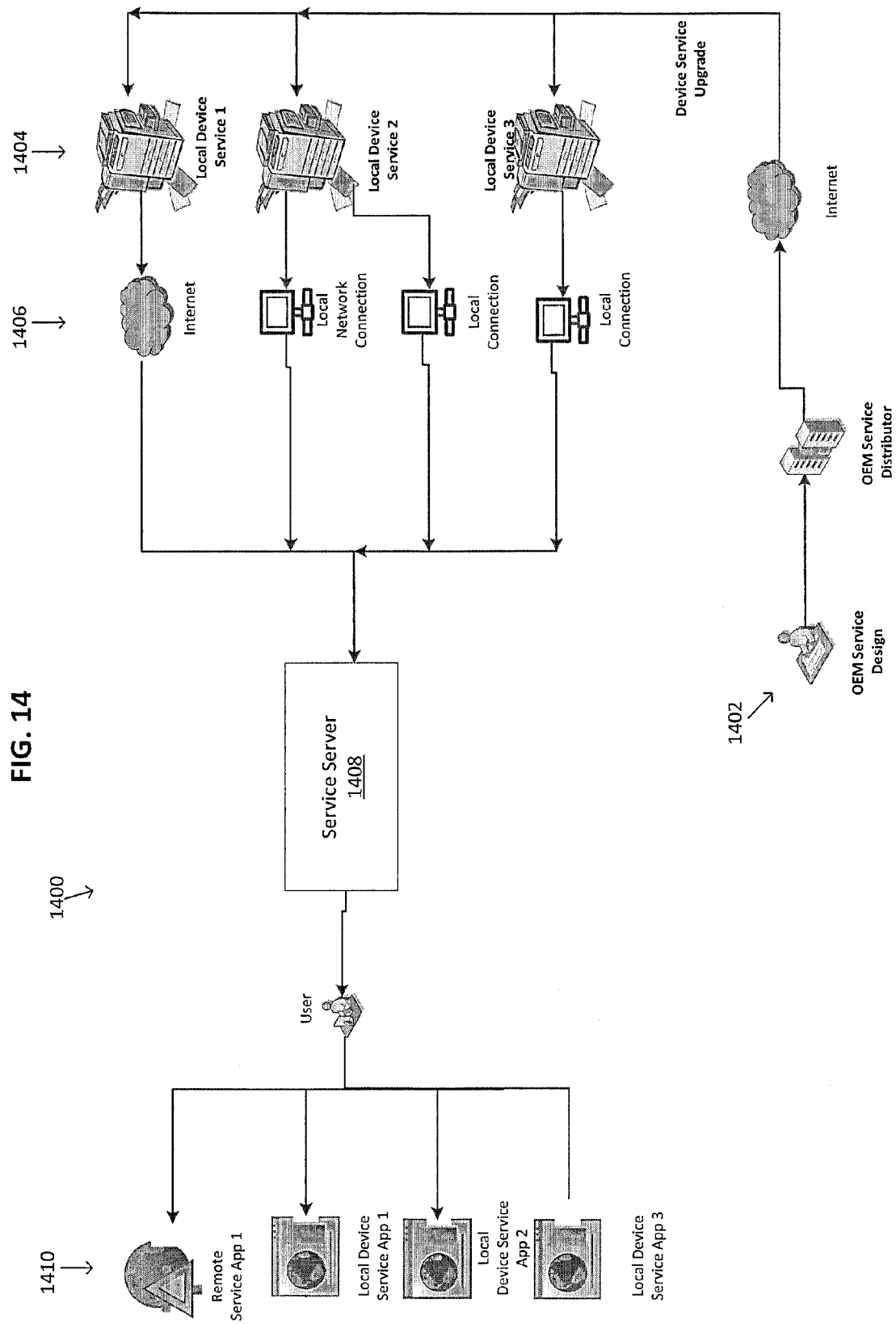
FIG. 14 is a block diagram that depicts and arrangement on which the approach for providing service workflows through devices may be implemented.

FIG. 14 is a block diagram that depicts and arrangement 1400 on which the approach for providing service workflows through devices may be implemented. Starting with 1402, an original equipment manufacturer (OEM) designs services that are provided to the OEM service distributor, which in turn provides the service to local devices 1404, as Service 1, Service 2 and Service 3, respectively. Service information for Service 1, Service 2 and Service 3 is provided to a service server 1408 via local connections, local network connections and other networks, such as the Internet. The service server 1408 generates and makes available service applications 1410, which include a Remote Service Application (App) 1, a local device Service App 1, a local Service App 2 and local device Service App 3. The service applications 1410 allow user access to the Service 1, Service 2 and Service 3 on local devices 1402. Service server 1408 may be implemented, for example, by computer hardware and computer software, or any combination of computer hardware and computer software. In addition, service server 1408 may be implemented on any client device, intermediary device, or even on local devices 1404, depending upon a particular implementation.

Figure 15:
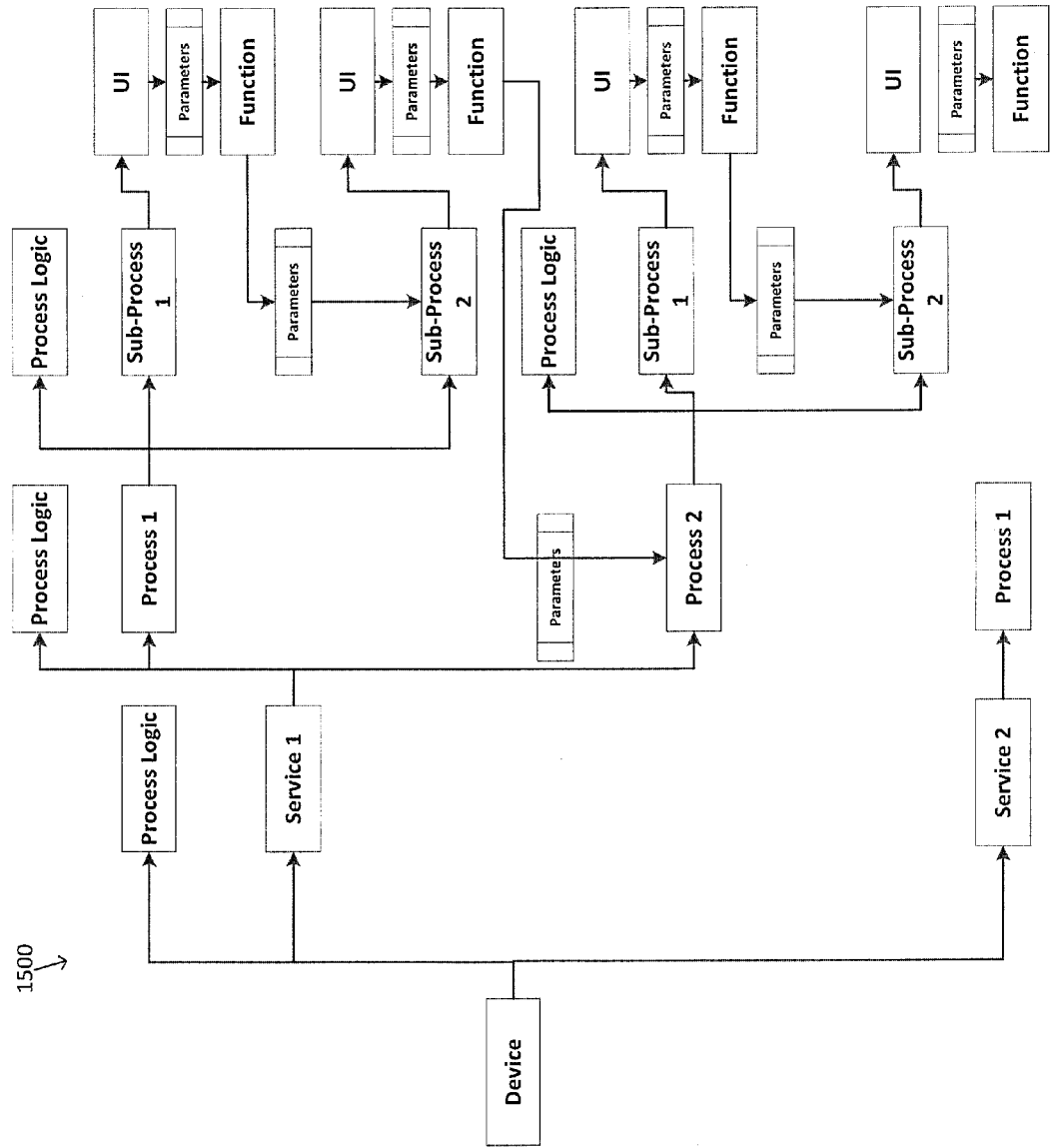
FIG. 15 is a diagram that depicts example components of a device service.

FIG. 15 is a diagram 1500 that depicts example components of a device service. In this example, the device supports two services, Service 1 and Service 2 and includes process logic to implement Service 1 and Service 2. Service 1 includes two processes, Process 1 and Process 2, implemented by process logic. Process 1 includes two sub-processes, Sub-Process 1 and Sub-Process 2, implemented by process logic. Sub-Process 1 has a corresponding user interface (UI), from which parameters are received and provided to a function. The function outputs parameters that are provided as an input to Sub-Process 2. Sub-Process 2 has a corresponding user interface (UI), from which parameters are received and provided to a function. The function outputs parameters that are provided as an input to Process 2. Process 2 includes two sub-processes, Sub-Process 1 and Sub-Process 2, implemented by process logic. Sub-Process 1 has a corresponding user interface (UI), from which parameters are received and provided to a function. The function outputs parameters that are provided as an input to Sub-Process 2. Sub-Process 2 has a corresponding user interface (UI), from which parameters are received and provided to a function. Service 2 includes one process, Process 1.

Figure 16:
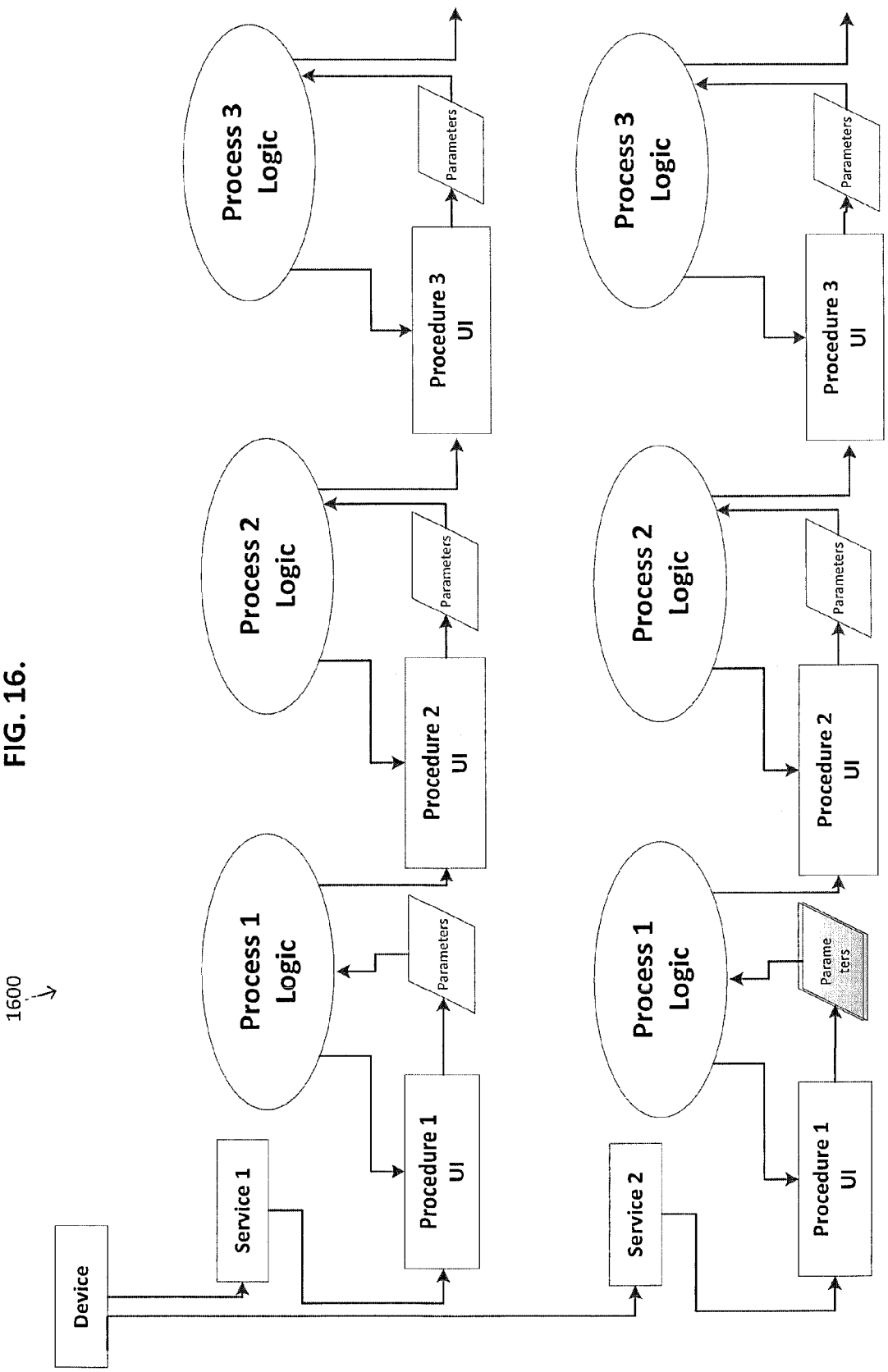
FIG. 16 is a block diagram that depicts device service workflows.

FIG. 16 is a block diagram 1600 that depicts device service workflows. In this example, a device supports two services, Service 1 and Service 2. Service 1 and Service 2 each include logic for three processes, namely, Process 1 Logic, Process 2 Logic and Process 3 Logic. The process logic implements a UI for each procedure that provides parameters to the process logic. More specifically, Procedure 1 UI provides parameters to Process 1 Logic, Procedure 2 UI provides parameters to Process 2 Logic and Procedure 3 UI provides parameters to Process 3 Logic. In addition, the process logic provides outputs that are used as inputs for a next procedure. Process 1 Logic provides outputs that are used as inputs to the Procedure 2 UI, Process 2 Logic provides outputs that are used as inputs to the Procedure 3 UI and Process 3 Logic provides outputs that are used as inputs to another procedure (not depicted).

Figure 17:
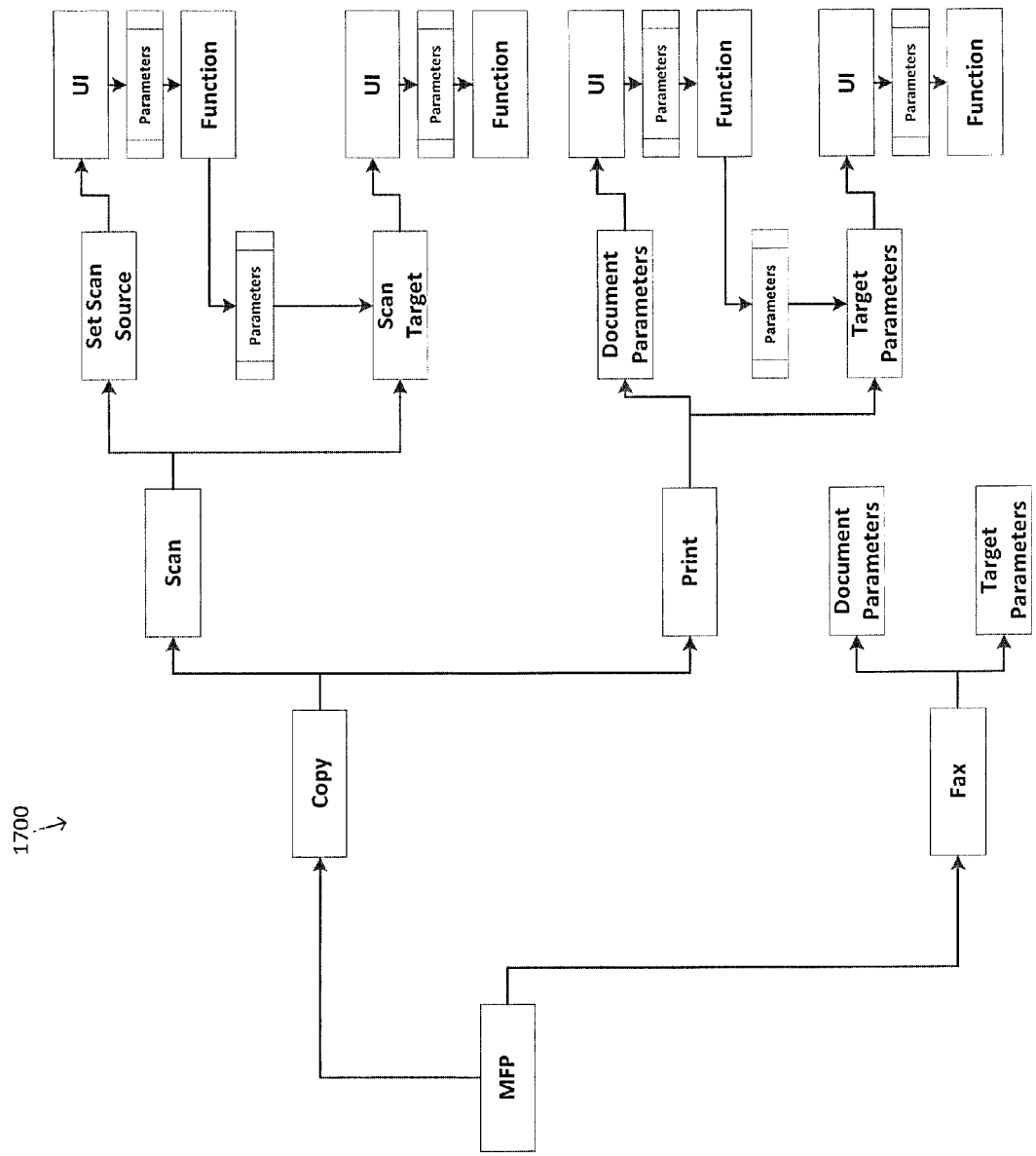
FIG. 17 is a block diagram that depicts an example service workflow for a Multi-Function Peripheral (MFP).

FIG. 17 is a block diagram 1700 that depicts an example service workflow for a Multi-Function Peripheral (MFP). MFPs are devices that support two or more functions, implemented by one or more services. For example, an MFP may support printing, copying, faxing, or any combination thereof. In this example, the MFP supports two services, Copy and Fax. The Copy service includes a Scan process and a Print process. The Scan process includes two sub-processes that include a Set Scan Source sub-process and a Scan Target sub process. The Set Scan Source sub-process handles parameters for scanning a document and the Scan Target sub process handles parameters for a target device to receive the scan data. The Set Scan Source sub-process implements a UI that provides parameters to a function. The function outputs parameters to the Scan Target sub-process. The Scan Target sub-process receives the parameters output by the function of the Set Scan Source sub-process and implements a UI that provides parameters to a function. The Print process includes two sub-processes that include a Document Parameters sub-process and a Target Parameters sub process. The Document Parameters sub-process implements a UI that provides parameters to a function. The function outputs parameters to the Target Parameters sub-process. The Target Parameters sub-process receives the parameters output by the function of the Document Parameters sub-process and implements a UI that provides parameters to a function. The Fax service includes a Document Parameters process and a Target Parameters process. The Document Parameters process handles parameters related to the document to be faxed and the Target Parameters process handles parameters related to the target device that is to receive the fax.

Figure 18:
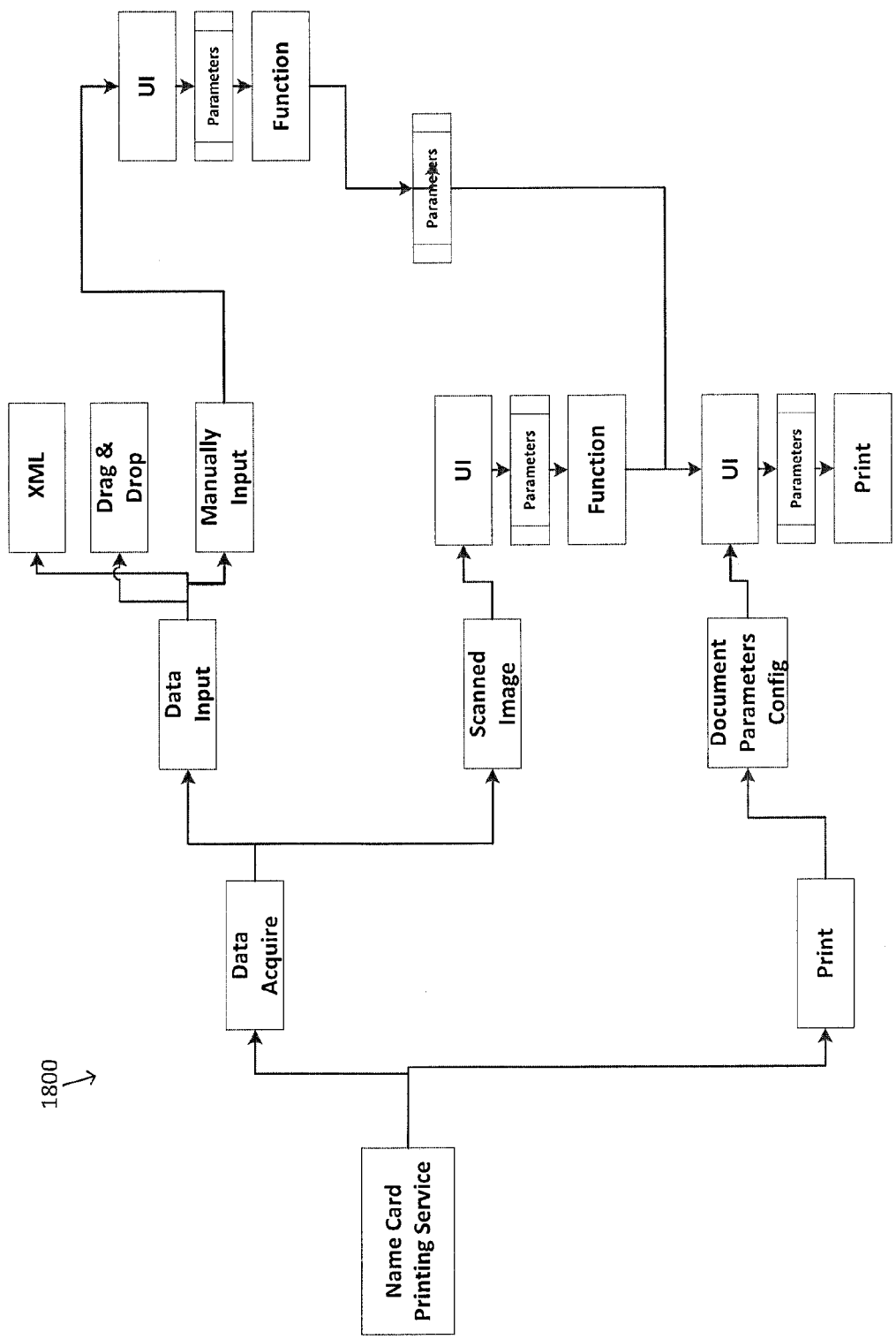
FIG. 18 is a block diagram that depicts an example service workflow for a name card printing service.

FIG. 18 is a block diagram 1800 that depicts an example service workflow for a name card printing service. In this example, the name card printing service includes a Data Acquire process and a Print process. The Data Acquire process includes a Data Input sub-process and a Scanned Image sub-process. The Data Acquire process supports data input via a markup language, such as XML, drag & drop, or manual input to a UI that outputs parameters to a function. The Scanned Image process implements a UI that outputs parameters to a function. The Print process includes a Document Parameters Configuration sub-process that implements a UI that receives parameters from the function implemented by the Data Input sub-process and parameters from the Scanned Image function. The UI outputs parameters to a Print sub-process.

Figure 19:
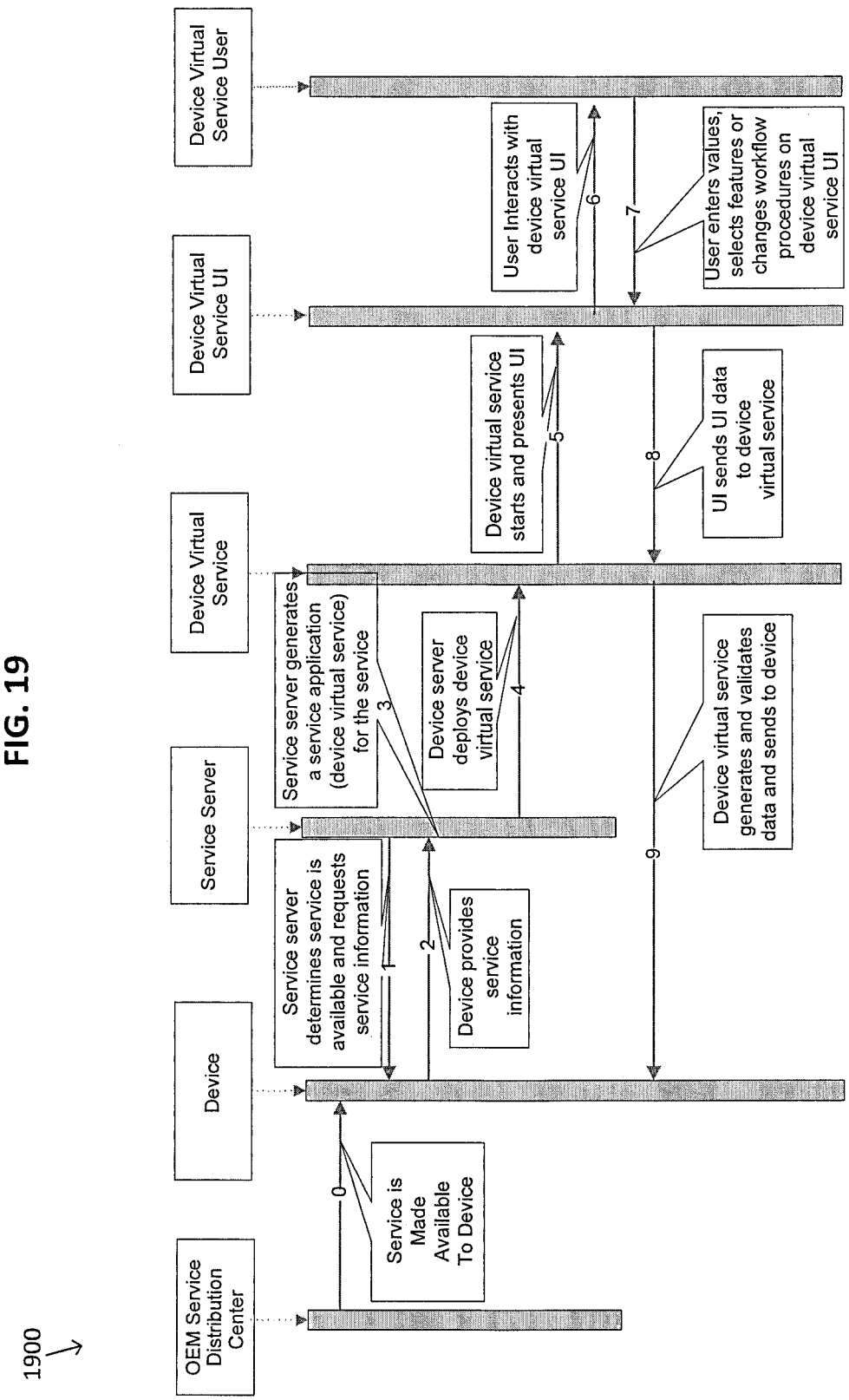
FIG. 19 is a block diagram that depicts a process for generating for a device a service application, also referred to herein as a device virtual service.

FIG. 19 is a block diagram 1900 that depicts a process for generating for a device a service application, also referred to herein as a device virtual service. In Step 0, a service is made available to a device. For example an OEM Service Distribution Center may update the firmware or install software onto a device 1404 to make the service available to the device 1404. The example in FIG. 19 is depicted and described in the context of adding a new service to a device, but the approach is not limited to this context and is applicable to upgrading existing services or to existing services that may not have been previously known to the service server 1408.

In Step 1, the service server 1408 determines that the service is available and requests service information for the service from the device 1404. For example, the device 1404 may notify the service server 1408 of the existence of the service, or the service server 1408 may query the device 1404 to learn about the existence of the service. The service server 1408 may request the service information from the device 1404 using various queries, API calls, etc. In Step 2, the device 1404 provides the service information for the service, for example in response to the queries from the service server. Thus, in the current approach, devices are configured to provide their service information to a service server. The service information is described in more detail hereinafter.

In Step 3, the service server 1408 generates a service application for the service, based at least upon the service information obtained for the service. The service application is also referred to herein as a device virtual service. The device virtual service is implemented as a client application that includes all of the functionality necessary for a client device to use the service. In Step 4, the device server 1408 deploys the device virtual service to a client device. This may include, for example, the device server 1408 supplying one or more files, including an executable program, to a client device. In Step 5, the device virtual service starts on the client device and presents a UI. In Step 6, a user interacts with the device virtual service UI. In Step 7, the user of the device virtual service enters values, selects features or changes workflow procedures on the device virtual service UI. For example, a user may select particular functions and provide parameter values to be used by the selected functions. In Step 8, the device virtual service UI provides the data to the device virtual service. In Step 9, the device virtual service generates, validates and provides data to the device 1404. The data includes all of the information that is necessary for the service on the device to implement the request made by the user via the device virtual service UI.

Service Information

The service information for a service may include various types of information that may vary depending upon a particular implementation and the approaches described herein are not limited to any particular service information. For example, the service information may include service UI information, service process information, service parameter information, process workflow information and process workflow logic. Service information may be implemented in various forms that may vary depending upon a particular implementation and the approaches described herein are not limited to service information in any particular form. For example, service information may be represented by data contained in one or more data files, a markup language, such as XML, or by programming language statements. The service UI information is information that defines or that can be used to create a device virtual service UI. The service process information indicates one or more processes that implement the service. The service parameter information indicates parameters used by the processes. The process workflow information indicates a starting process, a sequence of processes, if more than one process is involved, and error handling, for example how the workflow proceeds if a process encounters an error. The process workflow logic implements the processes. For example, the process workflow logic may include decision logic for the processes implement the service.

FIG. 20 depicts example service UI information in the form of XML statements 2000. The XML statements allow the service server 1408 to generate a service application that implements the UI as depicted by the GUI 2010 of FIG. 20.

Table I below contains a schema description of a device service in the form of XML statements that describe a device service and its corresponding processes and workflows.

TABLE I

```
<?xml version="1.0" encoding="utf-8"?>
<xs:schema attributeFormDefault="unqualified" elementFormDefault="qualified"
        xmlns:xs="http://www.w3.org/2001/XMLSchema"
        targetNamespace="http://schemas.Ricoh-
USA.com/DeviceServiceWorkflow/manifest"
        xmlns="http://schemas.Ricoh-USA.com/DeviceServiceWorkflow/manifest"
        xmlns:m="http://schemas.Ricoh-USA.com/DeviceServiceWorkflow/manifest"
        >
    <!--DeviceService SCHEMA-->
    <xs:element name="DeviceService">
        <xs:complexType>
            <xs:all>
                <xs:element name="Identity" type="CT_Identity"/>
                <xs:element name="Resources" type="CT_Resources"/>
                <xs:element name="Prerequisites" type="CT_Prerequisites"/>
                <xs:element name="Dependencies" type="CT_Dependencies" />
                <xs:element name="Capabilities" type="CT_Capabilities" />
                <xs:element name="Services" type="CT_Services" />
            </xs:all>
        </xs:complexType>
    </xs:element>
    <!--IDENTITY-->
    <xs:complexType name="CT_Identity">
        <xs:attribute name="Name" type="ST_ServiceName" use="required"/>
        <xs:attribute name="ServiceCategory" type="ST_Category" use="optional"/>
        <xs:attribute name="Publisher" type="ST_Publisher" use="required"/>
        <xs:attribute name="Version" type="ST_VersionQuad" use="required"/>
        <xs:attribute name="ResourceId" type="ST_Resources" use="optional"/>
    </xs:complexType>
    <!--Services-->
    <xs:complexType name="CT_Services">
        <xs:sequence>
            <xs:element name="Services" maxOccurs="100">
                <xs:complexType>
                    21 xs:all>
                        <xs:element name="VisualUIElements" type="CT_VisualUIElements"/>
                        <xs:element name="ServiceLogicRules" type="CT_ServiceLogicRules" />
                        <xs:element name="Parameters" type="CT_Parameters" />
                        <xs:element name="PreviousProcess" type="CT_Services" />
                        <xs:element name="NextProcess" type="CT_Services" />
```

TABLE I-continued

```
            <xs:element name="Output" type="CT_Parameters" />
            <xs:element name="ErrorProcess" type="CT_ErrorProcess" />
            <xs:element name="EntryPoint" type="ST_EntryPoint" />
            <xs:element name="Services" type=" CT_Services " />
          </xs:all>
          <xs:attribute name="Id" type="ST_ServiceId" use="required"/>
          <xs:attribute name="Executable" type="ST_Executable" use="optional"/>
          <xs:attribute name="StartPage" type="ST_FileName" use="optional"/>
        </xs:complexType>
      </xs:element>
    </xs:sequence>
  </xs:complexType>
  <xs:complexType name="CT_ServiceLogicRules">
    <xs:sequence>
      <xs:element name="ParameterMatch" maxOccurs="100">
        <xs:complexType>
          <xs:attribute name="Type" type="CT_Parameters" use="required"/>
          <xs:attribute name="Match" type="CT_Parameters" use="required"/>
        </xs:complexType>
      </xs:element>
      <xs:element name="ErrorCheck" maxOccurs="100">
        <xs:complexType>
          <xs:attribute name="Type" type="CT_ErrorStatus" use="required"/>
          <xs:attribute name="Match" type="CT_NoError" use="required"/>
        </xs:complexType>
      </xs:element>
    </xs:sequence>
  </xs:complexType>
  <xs:simpleType name="ST_EntryPoint">
    <xs:restriction base="ST_NonEmptyString">
      <xs:maxLength value="256"/>
    </xs:restriction>
  </xs:simpleType>
  <element name="CT_Parameters">
    <complexType>
      <sequence>
        <element maxOccurs="unbounded" name="Property">
          <complexType>
            <choice>
              <element name="ByteArray" type="hexBinary" />
              <element name="Bool" default="false" type="boolean" />
              <element name="String" type = "string" />
              <element name="Int32" type="int" default="0" />
            </choice>
            <attribute name="Name" type="string" use="required" />
          </complexType>
        </element>
      </sequence>
    </complexType>
  </element>
</xs:schema>
```

Table II below contains an example name card printing service that may be implemented on a device. The name card printing service includes two processes: name card data acquire and name card print. Table II contains example XML statements that define the name card printing service and its two constituent processes. In the XML statements, the name card data acquire process is specified as "NameCardDataAcquire" and the name card print process is specified as "NameCardPrint".

TABLE II

```
<?xml version="1.0" encoding="utf-8"?>
<DeviceService  xmlns:xs="http://www.w3.org/2001/XMLSchema"
        xmlns="http://schemas.Ricoh-
USA.com/DeviceServiceWorkflow/manifest">
  <Identity Name="Ricoh Name Card Printing Service"
ServiceCategory="Special Service Printing" Version "1.0"
Publisher="Ricoh"/>
  <Services ID="NameCardDataAcquire"
Executable="NameCardDataAcquire.Exe" EntryPoint="UIEntrance"
StartPage="WelcomePage">
```

TABLE II-continued

```
    <Services ID="DataInput" Executable="NameCardDataAcquire.Exe"
EntryPoint="DataInput" StartPage="DataInputPage">
      <Services ID="XML Input"
Executable="NameCardDataAcquire.Exe" EntryPoint="XMLDataInput"
StartPage="XMLDataInputPage"/>
      <Services ID="DragAndDrop"
Executable="NameCardDataAcquire.Exe" EntryPoint="DragAndDrop"
StartPage="DragAndDropDataInputPage"/>
      <Services ID="Manual Input"
Executable="NameCardDataAcquire.Exe" EntryPoint="ManualInput"
StartPage="ManualInputPage">
        <VisualUIElements>ManualInputUIModule</
VisualUIElements>
        <Parameters>ManualInputUIModule_Parameter</Parameters>
        <PreviousProcess>None</PreviousProcess>
        <NextProcess>NameCard_Print</NextProcess>
        <Output>NameCard_Information</Output>
        <ErrorProcess>Service_Restart</ErrorProcess>
<ServiceLogicRules>NameCard_Information_Valid</ServiceLogicRules
>
      </Services>
    </Services>
  </Services>
```

TABLE II-continued

```
    <Services ID="NameCardPrint" Executable="NameCardPrint.Exe"
EntryPoint="NameCardPrint" StartPage="DocumentConfig">
        <Services ID="DocumentConfig"
Executable="NameCardDataAcquire.Exe" EntryPoint="DocumentConfig"
StartPage="DocumentConfigUIPage">
            <VisualUIElements>DocumentConfigUIPage</VisualUIElements>
            <Parameters>NameCard_Information</Parameters>
            <PreviousProcess>NameCardDataAcquire</PreviousProcess>
            <NextProcess>None</NextProcess>
            <Output>NameCard_JobTicket</Output>
            <ErrorProcess>NameCardPrint_Service_Restart</ErrorProcess>
<ServiceLogicRules>NameCard_JobTicket_Valid</ServiceLogicRules>
        </Services>
    </Services>
<UIDef name="DocumentConfigUIPage">
        <Image Source="RicohIcon.png" Margin="0,417,504.8,4.2"/>
        <TabControl>
            <TabItem Header="Papge/Quality">
                <GroupBox Header="Orientation">
                    <ComboBox Uid="ComboBox_Orientation"/>
                    <CheckBox Uid="CheckBox_Roate180"/>
                </GroupBox> -<GroupBox Header="Copies/Collate">
                    <TextBox Uid="TextBox_Copies"/>
                    <CheckBox Content="Collate"/>
                </GroupBox> -<GroupBox Header="Paper Options">
                    <Label Content="Paper Size:"/>
                    <ComboBox Uid="ComboBox_PaperSize"/>
                    <Label Content="Paper Source:"/>
                    <ComboBox Uid="ComboBox_PaperSource"/>
                    <Label Content="Paper Type:"/>
                    <ComboBox Uid="ComboBox_PaperType"/>
                </GroupBox>
            </TabItem>
            <TabItem Margin="0" Header="Finishing">
                <GroupBox Header="Print on Both Sides:">
                    <ComboBox Uid="ComboBox_Duplex"/>
                </GroupBox>
            </TabItem>
        </TabControl>
    </UIDef>
</DeviceService>
```

Upon invocation of the name card printing service, the first process "NameCardDataAcquire" is started and the page "DataInputPage" of the process's UI module "ManualInputModule" is displayed to allow a user to enter name card information. During data entry, the "NameCardDataAcquire" process invokes a validation module "NameCard_Information_Valid" to validate the entered data. After the user has finished entering data, the "NameCardDataAcquire" process invokes the next process "NameCard_Print", as specified by the <NextProcess> tag. The "NameCardDataAcquire" process invokes passes, as output, "NameCard_Information" to the "NameCard_Print" process, as indicated by the <Output> tag.

Once the second process, name card print, has started, the page "DocumentConfigUIPage" of the process's UI module "DocumentConfigUIPage" is displayed to allow a user to specify property values of the target printer, such as paper size, text fonts, etc. After the user has finished entering the property values, the process generates its final data into a service XML job ticket named "NameCard_JobTicket", as specified by the <Output> tag. The name card print process also validates the XML job ticket by invoking a validation module named "NameCard_JobTicket_Valid", as indicated by the <ServiceLogicRules> tag. The XML job ticket is then sent to the device for processing.

Adding Services

Services may be added at any time to the service server 1408. FIG. 21 is a flow diagram 2100 that depicts adding a service to the service server 1408. In step 2102, a service becomes available for a device, such as one of devices 1404. Service server 1408 may be notified about the service from the device 1404, or by querying the device 1404. In step 2104, the service server 1408 attempts to obtain service information for the service, for example, by querying a service provider or the device 1404. In step 2106, a determination is made whether authentication is required. If so, then in step 2108, authentication information, e.g., user ID, password, etc., is obtained and verified. For example, a user may be queried to enter a user ID and password via a GUI. If, in step 2108, the authentication is successful, or if in step 2106, no authentication is required, then in step 2110, the service server 1408 obtains the service information for the service. For example, the service server 1408 may obtain the service information from a service provider that provided the service, or from the device 1404.

In step 2112, a determination is made whether the service should be added to the service server 1408. This determination may be made using a variety of techniques, depending upon a particular implementation. For example, a policy may for a particular business organization or domain may be used to determine whether the service should be added to the service server 1408. One example policy is that only services included on a trusted service provider list are added. Another example policy is that only services where the service information can be obtained via a secure connection are added to the service server 1408. As service may be filtered, for example, based upon the name of a provider, an embedded certification, a service category, a security level of a service, etc. Business organizations may establish filter policies to determine whether a service should be added to a service server. If a determination is made in step 2112 that the service is not to be added to the service server, then in step 2114, a notification is provided that the service cannot be added to the service server. For example, a message may be displayed indicating that the service cannot be added to the service server because doing so would violate a particular policy. If a determination is made in step 2112 that the service is to be added to the service server, then in step 2116, the service server 1408 generates a service application for the service based upon the service information. For example, the service server 1408 examines and/or parses the service information for the service to generate a service application that implements the processes that implement the service.

In step 2118, a determination is made whether the service should be made available to the user. This determination may be made, for example, by applying a policy or filter for a particular user. For example, a determination may be made that the service should be made available to the particular user if the service is in a user-selected category, or is on the particular user's approved service list, or if a personnel credential is established. Thus, service applications generated by the service server 1408 may be made available on a per-user basis. If the service should not be made available to the particular user, then the service is not made available to the particular user and the process continues to step 2102. If, in step 2118, a determination is made that the service should be made available to the particular user, then in step 2120, data is updated to reflect that the service is available to the particular user. This may include, for example, updating a database maintained by the service server 1408. In addition, in step 2122, the service server notifies the client device that the service is available and in step 2124, a service client application executing on the client device is updated to make the service available to the particular user.

Figure 22:
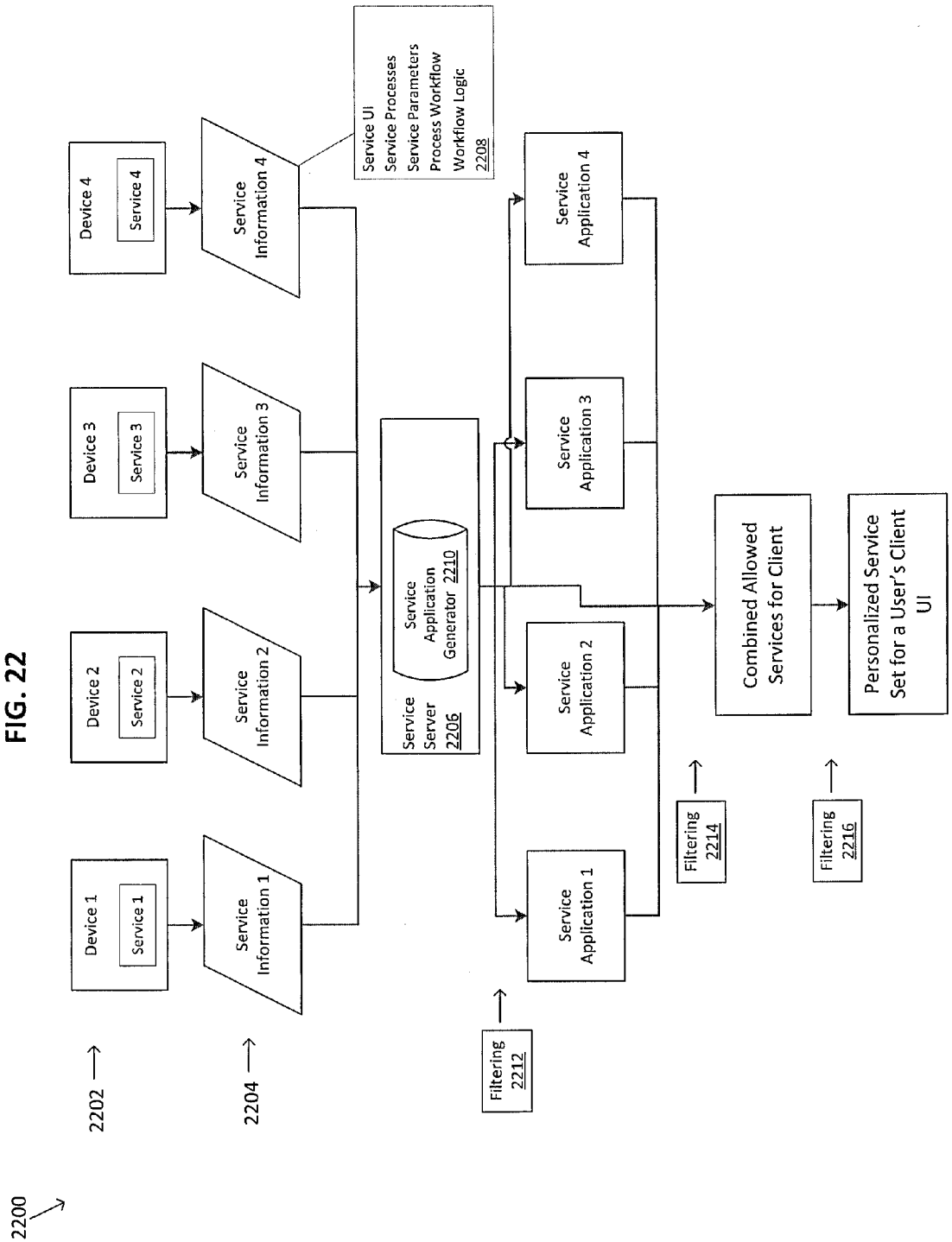
FIG. 22 is a block diagram that depicts an example service information data flow.

FIG. 22 is a block diagram 2200 that depicts an example service information data flow. A set of devices 2202 each supports and provides any number of services. In the present example, for purposes of explanation only, each device 2202 is depicted in FIG. 22 and described herein as supporting one service, identified as Service 1, Service 2, Service 3 and Service 4, respectively. Each device 2202 provides service information 2204 to a service server 2206 for the services that they support and provide. Thus, Device 1 provides to service server 2206 Service Information 1 for Service 1. Similarly, Device 2 provides to service server 2206 Service Information 2 for Service 2, Device 3 provides to service server 2206 Service Information 3 for Service 3 and Device 4 provides to service server 2206 Service Information 4 for Service 4. Service server 2206 is not limited to obtaining service information from devices and service server 2206 may obtain service information from other locations, for example, service providers. Example service information 2208 includes, without limitation, information that defines or specifies a service UI, one or more service processes, one or more service parameters, process workflow and workflow logic. Devices 2202 may provide their service information 2204 to service server 2206 via various communications links. Example communications links include, without limitation, direct communications links, wired links, such as a USB connection, wired networks, wireless networks, or any combination thereof. Devices 2202 may also provide their service information 2204 to service server 2206 via other methods, for example, via portable media, such as a flash drive, memory stick, etc.

The service server 2206 includes a service application generator 2210 that generates service applications based upon service information. In the present example, service server 2206 generates four service applications, Service Application 1, Service Application 2, Service Application 3 and Service Application 4 that correspond, respectively, to Service 1, Service 2, Service 3 and Service 4. Filtering 2212 may be applied to control the service applications that are made available to one or more devices. For example, a business organization may apply filtering 2210 based upon a company policy to control the service applications that are made available. An example policy is that a service application must be included on a trusted service provider list or that the service application is obtained over a secure connection. Filtering 2214 may be applied to control the combined service applications, and therefore the services, that are made available to a particular client device. Further filtering 2216 may be applied to control the service applications that are made available to a particular user to provide a personalized service set for a user's client device UI. Thus, the distribution of client applications generated by service server 2206 may be managed at the business organization level, the client device level, or the user level.

Generating Service Applications

Figure 23:
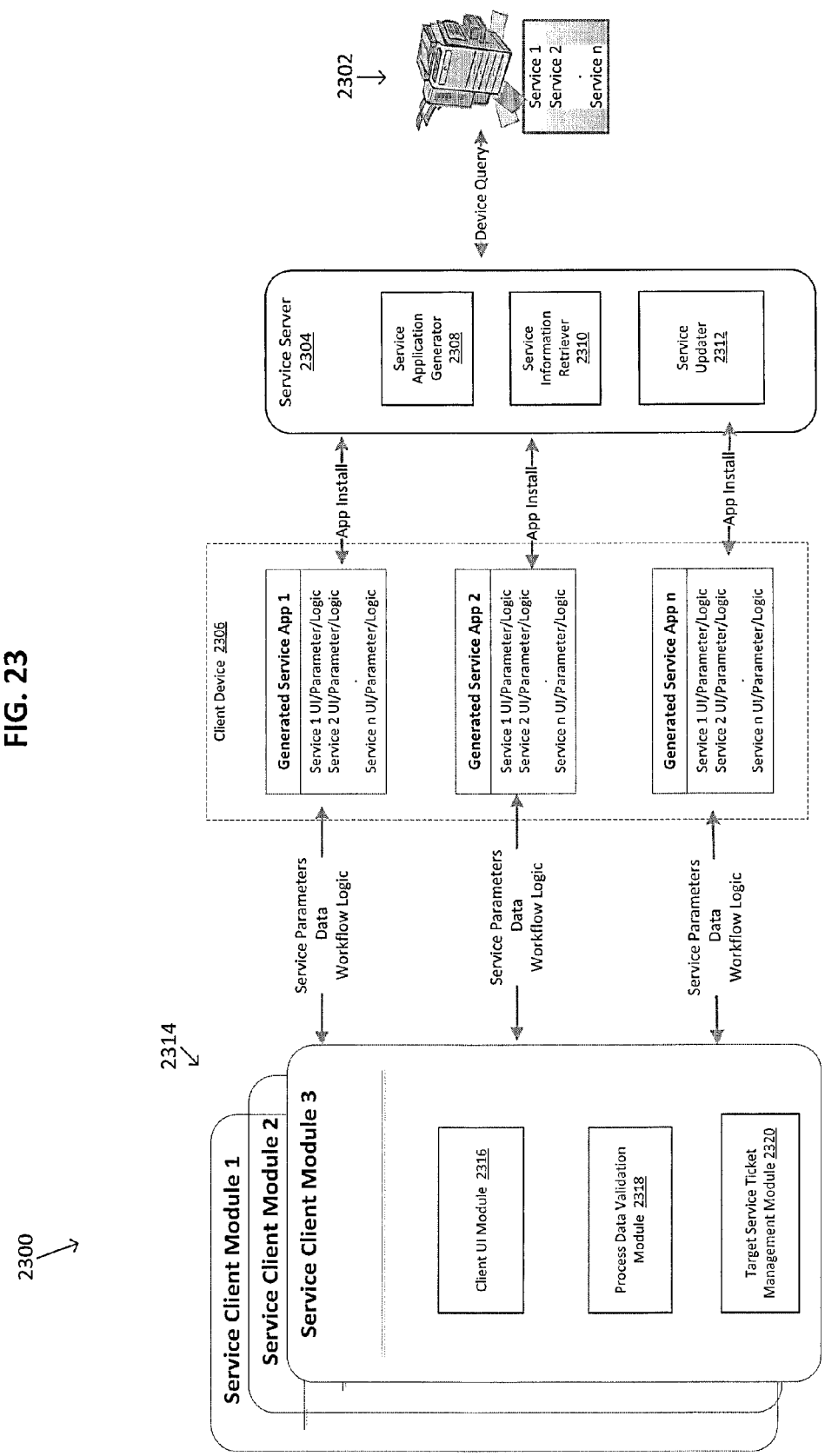
FIG. 23 depicts and arrangement for providing service workflows through devices according to one embodiment.

FIG. 23 depicts and arrangement 2300 for providing service workflows through devices according to one embodiment. In this example, arrangement 2300 includes a device 2302, a service server 2304 and a client device 2306. Device 2302 may be any type of device. Examples of device 2302 include, without limitation, a printer, a copier, a facsimile machine, an MFP, etc. In the present example, device 2302 implements one or more services, e.g., Service 1, Service 2 . . . . Service n. Service server 2304 includes a service application generator 2308, a service information retriever 2310 and a service updater 2312. Service server 2304 may include various other elements that may vary depending upon a particular implementation. For example, service server 2304 may include local storage for storing service information retrieved from devices or other sources, generated service applications, etc. This may include service information databases, as previously described herein.

The various elements of service server 2304, including service application generator 2308, service information retriever 2310 and service updater 2312 may be implemented by computer hardware elements, computer software, or any combination of computer hardware elements and computer software, depending upon a particular implementation. Service information retriever 2310 is configured to retrieve service information from devices or service providers, for example using queries. Service information retriever 2310 may also cause the retrieved service information to be stored on service server 2304. Service application generator 2308 is configured to generate service applications for client devices. In the example depicted in FIG. 23, service application generator 2308 generates and installs on client device 2306 service applications that are identified as "Generated Service App 1", "Generated Service App 2" and "Generated Service App3". Service application generator 2308 generates service applications based upon service information for the services. Each service application may implement one or more services, depicted in FIG. 23 as Service 1, Service 2 . . . Service n. Each service application implements a UI, parameter management and logic for the corresponding services.

Service client modules 2314 are generated by service server 2304 based upon service information for the corresponding services and execute on client devices. The service client modules 2314 exchange service parameters, data and workflow logic with the generated service applications on client device 2306. Each service client module 2314 includes a client UI module 2316, a process data validation module 2318 and a target service ticket management module 2320. The client UI module 2316 generates a UI and causes the UI to be displayed on a display of the client device upon which the service client module 2314 is installed. The process data validation module 2318 validates process data used by the service. Target service ticket management module 2320 generates service tickets for the client device upon which the service client module 2314 is installed.

Service updater 2312 is configured to determine that services, or updated services, are available for devices. Service updater 2312 may be notified by devices or service providers that services are available. Alternatively, service updater 2312 may query devices or service providers to determine whether services are available.

Accessing Service Applications

Figure 24:
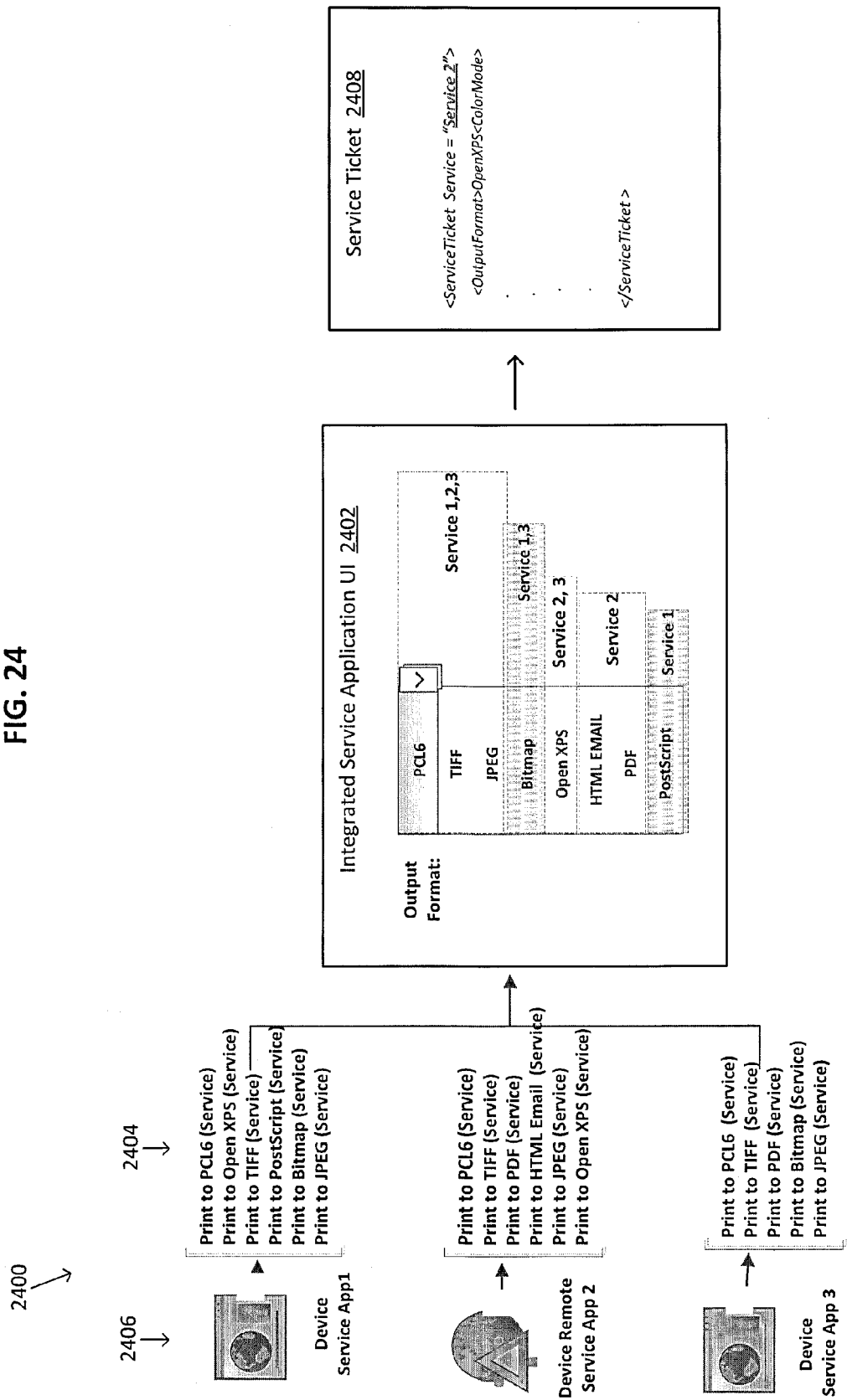
FIG. 24 is a block diagram that depicts an environment for generating service tickets.

FIG. 24 is a block diagram that depicts an environment 2400 for generating service tickets. An integrated service application UI 2402 provides access to a plurality of services 2404 that are supported by device service applications 2406. Each of the services 2404 is implemented by a service client module, for example as depicted in FIG. 23. The integrated service application UI 204 may be generated by the service server 1408 that also determines a device to provide the requested services.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 25:
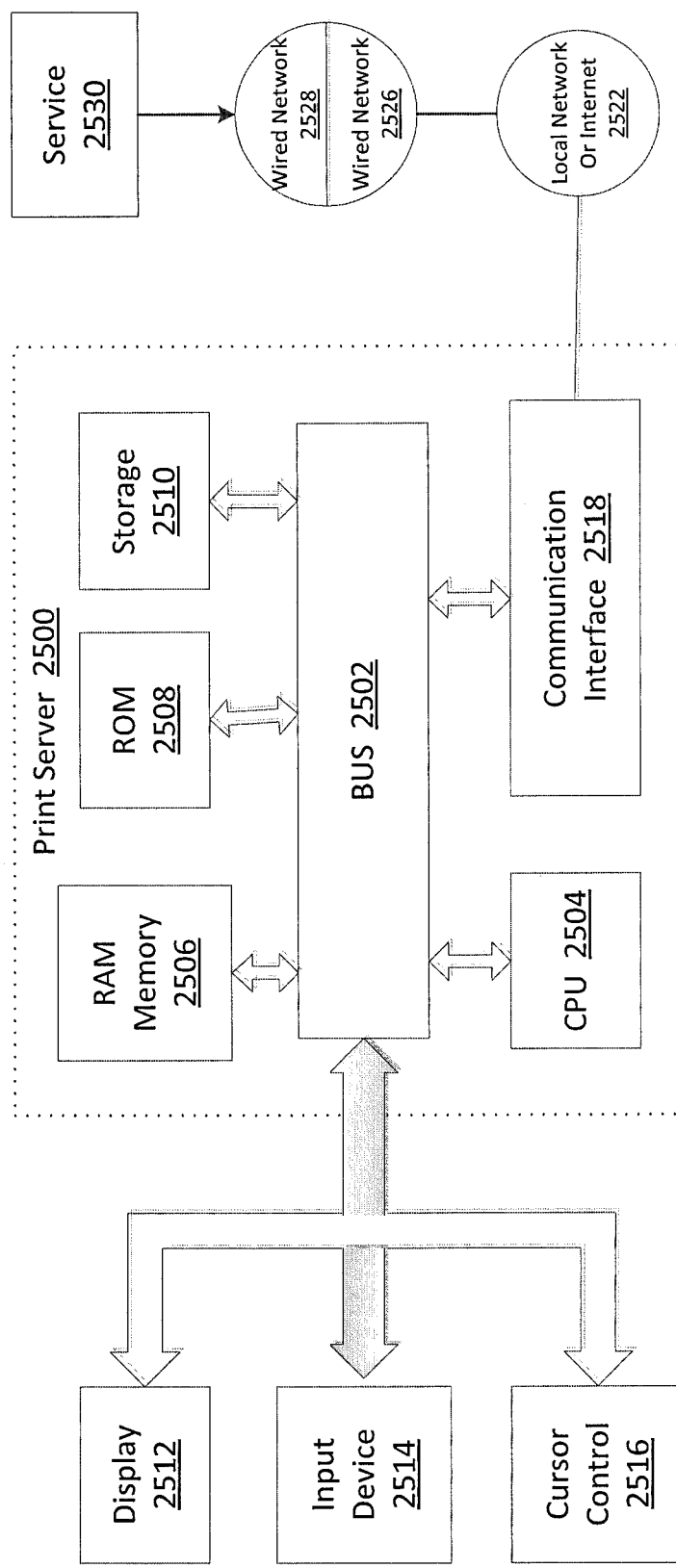
FIG. 25 is a block diagram that depicts a print server upon which an embodiment may be implemented.

For example, FIG. 25 is a block diagram that depicts a print server 2500 upon which an embodiment may be implemented. Print server 2500 includes a bus 2502 or other communication mechanism for communicating information, and a hardware CPU 2504 coupled with bus 2502 for processing information. Hardware CPU 2504 may be, for example, a general purpose microprocessor.

Print server 2500 also includes a RAM memory 2506, such as a random access memory (RAM) or other dynamic storage device, coupled to bus 2502 for storing information and instructions to be executed by CPU 2504. RAM memory 2506 also may be used for storing temporary variables or other intermediate information during execution of instructions to be executed by CPU 2504. Such instructions, when stored in non-transitory storage media accessible to CPU 2504, render print server 2500 into a special-purpose machine that is customized to perform the operations specified in the instructions.

Print server 2500 further includes a read only memory (ROM) 2508 or other static storage device coupled to bus 2502 for storing static information and instructions for CPU 2504. A storage 2510, such as a magnetic disk or optical disk, is provided and coupled to bus 2502 for storing information and instructions.

Print server 2500 may be coupled via bus 2502 to a display 2512, such as a cathode ray tube (CRT), for displaying information to a computer user. An input device 2514, including alphanumeric and other keys, is coupled to bus 2502 for communicating information and command selections to CPU 2504. Another type of user input device is cursor control 2516, such as a mouse, a trackball, or cursor direction keys for communicating direction information and command selections to CPU 2504 and for controlling cursor movement on display 2512. This input device typically has two degrees of freedom in two axes, a first axis (e.g., x) and a second axis (e.g., y), that allows the device to specify positions in a plane.

Print server 2500 may implement the techniques described herein using customized hard-wired logic, one or more ASICs or FPGAs, firmware and/or program logic which in combination with the computer system causes or programs print server 2500 to be a special-purpose machine. According to one embodiment, the techniques herein are performed by print server 2500 in response to CPU 2504 executing one or more sequences of one or more instructions contained in RAM memory 2506. Such instructions may be read into RAM memory 2506 from another storage medium, such as storage 2510. Execution of the sequences of instructions contained in RAM memory 2506 causes CPU 2504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 2510. Volatile media includes dynamic memory, such as RAM memory 2506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2502. Transmission media can also take the form of acoustic or light waves, such as those generated during radio-wave and infra-red data communications.

Various forms of media may be involved in carrying one or more sequences of one or more instructions to CPU 2504 for execution. For example, the instructions may initially be carried on a magnetic disk or solid state drive of a remote computer. The remote computer can load the instructions into its dynamic memory and send the instructions over a telephone line using a modem. A modem local to print server 2500 can receive the data on the telephone line and use an infra-red transmitter to convert the data to an infra-red signal. An infra-red detector can receive the data carried in the infra-red signal and appropriate circuitry can place the data on bus 2502. Bus 2502 carries the data to RAM memory 2506, from which CPU 2504 retrieves and executes the instructions. The instructions received by RAM memory 2506 may optionally be stored on storage 2510 either before or after execution by CPU 2504.

Print server 2500 also includes a communication interface 2518 coupled to bus 2502. Communication interface 2518 provides a two-way data communication coupling to a network link 2520 that is connected to a local network or Internet 2522. For example, communication interface 2518 may be an integrated services digital network (ISDN) card, cable modem, satellite modem, or a modem to provide a data communication connection to a corresponding type of telephone line. As another example, communication interface 2518 may be a local area network (LAN) card to provide a data communication connection to a compatible LAN. Wireless links may also be implemented. In any such implementation, communication interface 2518 sends and receives electrical, electromagnetic or optical signals that carry digital data streams representing various types of information.

Network link 2520 typically provides data communication through one or more networks to other data devices. For example, network link 2520 may provide a connection to a service 2530 through a local network or Internet 2522, a wired network 2526 and a wired network 2528. Print server 2500 can send messages and receive data, including program code, through these networks and communication interface 2518.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory storage media storing instructions which, when processed by one or more processors, cause performance of:
   a service server determining that a service is available for a particular device;
   in response to determining that the service is available for the particular device, the service server obtaining, from the particular device, service information that specifies, for the service, one or more processes that implement the service on the particular device, one or more parameters for the one or more processes, one or more user interfaces for the one or more processes and process workflow logic for the one or more processes that implement the service;
   the service server generating, based upon the service information that specifies, for the service, one or more processes that implement the service on the particular device, one or more parameters for the one or more processes, one or more user interfaces for the one or more processes and process workflow logic for the one or more processes that implement the service, a service application that is executable on client devices and implements the service by implementing the one or more parameters, the one or more user interfaces, and the process workflow logic for the one or more processes that implement the service;
   the service server receiving, from a client device, a request to use the service for the particular device; and
   in response to receiving, from the client device, the request to use the service for the particular device, the service server providing to the client device the service application that executes on the client device and implements the service.

2. The one or more non-transitory storage media of claim 1, wherein the service information, for the service, further specifies one or more of one or more validation processes for the one or more processes, or error processing.

3. The one or more non-transitory storage media of claim 1, wherein:
   the service information, for the service, is defined by a plurality of markup language statements, and
   generating, based upon the service information, the service application that implements the service includes examining the plurality of markup language statements to identify the one or more processes that implement the service on the particular device, the one or more parameters for the one or more processes, the one or more user interfaces for the one or more processes and process workflow logic for the one or more processes that implement the service.

4. The one or more non-transitory storage media of claim 1, wherein the service server determining that the service is available for the particular device includes one or more of the service server receiving a notification from the particular device that the network service is available for the particular device, or the service server discovering that the network service is available for the particular device.

5. The one or more non-transitory storage media of claim 1, wherein the instructions include additional instructions which, when processed by the one or more processors, cause:
   generating an integrated service application user interface that allows a user to select one or more services from a set of available services;
   automatically selecting the particular device to provide the selected one or more services; and
   invoking one or more service applications on the particular device to provide the selected one or more services.

6. The one or more non-transitory storage media of claim 5, wherein the set of available services is determined by applying to a plurality of available services one or more of a filter associated with a business organization, a filter associated with a client device or a filter associated with a user.

7. The one or more non-transitory storage media of claim 6, wherein one or more of the filter associated with a business organization, the filter associated with a client device or the filter associated with a user include a policy that specifies attributes of service applications that may be made available to a user of the particular device.

8. An apparatus comprising:
   one or more processors; and
   one or more storage media storing instructions which, when processed by one or more computing devices, cause:
      a service server determining that a service is available for a particular device;
      in response to determining that the service is available for the particular device, the service server obtaining, from the particular device, service information that specifies, for the service, or more processes that implement the service on the particular device, one or more parameters for the one or more processes, one or more user interfaces for the one or more processes and process workflow logic for the one or more processes that implement the service;
      the service server generating, based upon the service information that specifies, for the service, one or more processes that implement the service on the particular device, one or more parameters for the one or more processes, one or more user interfaces for the one or more processes and process workflow logic for the one or more processes that implement the service, a service application that is executable on client devices and implements the service by implementing the one or more parameters, the one or more user interfaces, and the process workflow logic for the one or more processes that implement the service;
      the service server receiving, from a client device, a request to use the service for the particular device; and
      in response to receiving, from the client device, the request to use the service for the particular device, the service server providing to the client device the service application that executes on the client device and implements the service.

9. The apparatus of claim 8, wherein the service information, for the service, further specifies one or more of one or more validation processes for the one or more processes, or error processing.

10. The apparatus of claim 8, wherein:
    the service information, for the service, is defined by a plurality of markup language statements, and
    generating, based upon the service information, the service application that implements the service includes examining the plurality of markup language statements to identify the one or more processes that implement the service on the particular device, the one or more parameters for the one or more processes, the one or more user interfaces for the one or more processes and process workflow logic for the one or more processes that implement the service.

11. The apparatus of claim 8, wherein the service server determining that the service is available for the particular device includes one or more of the service server receiving a notification from the particular device that the network service is available for the particular device, or the service server discovering that the network service is available for the particular device.

12. The apparatus of claim 8, wherein the instructions include additional instructions which, when processed by the one or more processors, cause:
   generating an integrated service application user interface that allows a user to select one or more services from a set of available services;
   automatically selecting the particular device to provide the selected one or more services; and
   invoking one or more service applications on the particular device to provide the selected one or more services.

13. The apparatus of claim 12, wherein the set of available services is determined by applying to a plurality of available services one or more of a filter associated with a business organization, a filter associated with a client device or a filter associated with a user.

14. The apparatus of claim 13, wherein one or more of the filter associated with a business organization, the filter associated with a client device or the filter associated with a user include a policy that specifies attributes of service applications that may be made available to a user of the particular device.

15. A computer-implemented method comprising:
   a service server determining that a service is available for a particular device;
   in response to determining that the service is available for the particular device, the service server obtaining, from the particular device, service information that specifies, for the service, one or more processes that implement the service on the particular device, one or more parameters for the one or more processes, one or more user interfaces for the one or more processes and process workflow logic for the one or more processes that implement the service;
   the service server generating, based upon the service information that specifies, for the service, one or more processes that implement the service on the particular device, one or more parameters for the one or more processes, one or more user interfaces for the one or more processes and process workflow logic for the one or more processes that implement the service, a service application that is executable on client devices and implements the service by implementing the one or more parameters, the one or more user interfaces, and the process workflow logic for the one or more processes that implement the service;
   the service server receiving, from a client device, a request to use the service for the particular device; and
   in response to receiving, from the client device, the request to use the service for the particular device, the service server providing to the client device the service application that executes on the client device and implements the service.

16. The computer-implemented method of claim 15, wherein the service information, for the service, further specifies one or more of one or more validation processes for the one or more processes, or error processing.

17. The computer-implemented method of claim 15, wherein:
   the service information, for the service, is defined by a plurality of markup language statements, and
   generating, based upon the service information, the service application that implements the service includes examining the plurality of markup language statements to identify the one or more processes that implement the service on the particular device, the one or more parameters for the one or more processes, the one or more user interfaces for the one or more processes and process workflow logic for the one or more processes that implement the service.

18. The computer-implemented method of claim 15, wherein the service server determining that the service is available for the particular device includes one or more of the service server receiving a notification from the particular device that the network service is available for the particular device, or the service server discovering that the network service is available for the particular device.

19. The computer-implemented method of claim 15, wherein the instructions include additional instructions which, when processed by the one or more processors, cause:
   generating an integrated service application user interface that allows a user to select one or more services from a set of available services;
   automatically selecting the particular device to provide the selected one or more services; and
   invoking one or more service applications on the particular device to provide the selected one or more services.

20. The computer-implemented method of claim 19, wherein the set of available services is determined by applying to a plurality of available services one or more of a filter associated with a business organization, a filter associated with a client device or a filter associated with a user.

\* \* \* \* \*